US011893833B1

(12) United States Patent
McBride et al.

(10) Patent No.: US 11,893,833 B1
(45) Date of Patent: Feb. 6, 2024

(54) SYSTEMS AND METHODS UTILIZING GRAVITY FEED FOR POSTAGE METERING

(71) Applicant: Stamps.com Inc., El Segundo, CA (US)

(72) Inventors: Kenneth Thomas McBride, Palos Verdes Estates, CA (US); J P Leon, Marina Del Rey, CA (US)

(73) Assignee: AUCTANE, INC., Austin, TX (US)

( * ) Notice: Subject to any disclaimer, the term of this patent is extended or adjusted under 35 U.S.C. 154(b) by 209 days.

(21) Appl. No.: 17/134,425

(22) Filed: Dec. 27, 2020

Related U.S. Application Data

(60) Continuation of application No. 15/876,017, filed on Jan. 19, 2018, now Pat. No. 10,891,807, which is a division of application No. 12/344,080, filed on Dec. 24, 2008, now Pat. No. 9,911,246.

(51) Int. Cl.
*G07B 17/00* (2006.01)

(52) U.S. Cl.
CPC .............................. *G07B 17/00467* (2013.01)

(58) Field of Classification Search
CPC ................................................ G07B 17/00467
See application file for complete search history.

(56) References Cited

U.S. PATENT DOCUMENTS

| | | | | |
|---|---|---|---|---|
| 1,409,769 | A * | 3/1922 | Petterson | B41J 13/12 235/58 R |
| 1,684,756 | A | 9/1928 | Close | |
| 1,988,908 | A | 1/1935 | MacKinnon | |

(Continued)

FOREIGN PATENT DOCUMENTS

| | | | |
|---|---|---|---|
| DE | 4409386 | A1 | 9/1995 |
| EP | 0137737 | A2 | 4/1985 |

(Continued)

OTHER PUBLICATIONS

Brown, Bruce, and Brown, Marge, "Download Your Postage—Forget running to the post office for stamps. Now you can buy postage over the Internet whenever you want," PC Magazine, Ziff Davis, Inc., 108, Mar. 7, 2000.*

(Continued)

*Primary Examiner* — Nathan Erb
(74) *Attorney, Agent, or Firm* — Concept IP LLP; Pejman Yedidsion

(57) ABSTRACT

Systems and methods which utilize gravity feed for mail item movement in postage metering operations are shown. Embodiments provide for gravity drop feeding mail items into a portion of a postage metering system for metering operations, such as to activate or apply postage indicia thereto. Embodiments provide for gravity drop exit of mail items from a portion of a postage metering system after metering operations, such as activation or application of postage indicia thereto. Postage metering operations as performed by embodiments of the invention may comprise scanning and activation of preprinted tokens. Postage metering operations according to alternative embodiments of the invention may printing postage indicia. Embodiments provide processing in addition to or in the alternative to the aforementioned postage indicia activation or printing and mail item marking operations, such as weighing, sorting, etc.

19 Claims, 10 Drawing Sheets

(56) References Cited

U.S. PATENT DOCUMENTS

| | | | |
|---|---|---|---|
| 2,825,498 | A | 3/1958 | Alves |
| 2,887,326 | A | 5/1959 | Kramer |
| 2,964,232 | A | 12/1960 | Levyn |
| 2,988,984 | A * | 6/1961 | Eckert, Jr. ................. B07C 3/14 101/2 |
| 3,111,084 | A | 11/1963 | Ridenour et al. |
| 3,221,980 | A | 12/1965 | Mercur |
| 3,380,648 | A | 4/1968 | Lyra |
| 3,584,696 | A | 6/1971 | Eblowitz |
| 3,594,727 | A | 7/1971 | Braun |
| 3,658,239 | A | 4/1972 | Foutz |
| 3,691,726 | A | 9/1972 | Stephens et al. |
| 3,747,837 | A | 7/1973 | Wilson |
| 3,938,095 | A | 2/1976 | Check, Jr. et al. |
| 3,978,457 | A | 8/1976 | Check, Jr. et al. |
| 4,034,669 | A | 7/1977 | Freeman |
| 4,119,194 | A | 10/1978 | Freeman et al. |
| 4,201,339 | A | 5/1980 | Gunn |
| 4,245,775 | A | 1/1981 | Conn |
| 4,253,158 | A | 2/1981 | McFiggans |
| 4,271,481 | A | 6/1981 | Check, Jr. et al. |
| 4,306,299 | A | 12/1981 | Check, Jr. et al. |
| 4,376,299 | A | 3/1983 | Rivest |
| 4,493,484 | A | 1/1985 | Eyer |
| 4,511,793 | A | 4/1985 | Racanelli |
| 4,565,317 | A | 1/1986 | Kranz |
| 4,629,871 | A | 12/1986 | Scribner et al. |
| 4,641,347 | A | 2/1987 | Clark et al. |
| 4,649,266 | A | 3/1987 | Ecker |
| 4,661,001 | A | 4/1987 | Takai et al. |
| 4,709,850 | A | 12/1987 | Wagner |
| 4,725,718 | A | 2/1988 | Sansone et al. |
| 4,743,747 | A | 5/1988 | Fougere et al. |
| 4,744,554 | A | 5/1988 | Kulpa et al. |
| 4,757,537 | A | 7/1988 | Edelmann et al. |
| 4,760,532 | A | 7/1988 | Sansone et al. |
| 4,763,271 | A | 8/1988 | Field |
| 4,775,246 | A | 10/1988 | Edelmann et al. |
| 4,784,317 | A | 11/1988 | Chen et al. |
| 4,800,506 | A | 1/1989 | Axelrod et al. |
| 4,802,218 | A | 1/1989 | Wright et al. |
| 4,812,994 | A | 3/1989 | Taylor et al. |
| 4,821,195 | A | 4/1989 | Baer et al. |
| 4,831,554 | A | 5/1989 | Storace et al. |
| 4,831,555 | A | 5/1989 | Sansone et al. |
| 4,837,701 | A | 6/1989 | Sansone et al. |
| 4,853,865 | A | 8/1989 | Sansone et al. |
| 4,858,138 | A | 8/1989 | Talmadge |
| 4,862,386 | A | 8/1989 | Axelrod et al. |
| 4,864,618 | A | 9/1989 | Wright et al. |
| 4,868,757 | A | 9/1989 | Gil |
| 4,872,705 | A | 10/1989 | Hartfeil |
| 4,872,706 | A | 10/1989 | Brewen et al. |
| 4,873,645 | A | 10/1989 | Hunter et al. |
| 4,875,174 | A | 10/1989 | Olodort et al. |
| 4,893,249 | A | 1/1990 | Silverberg |
| 4,900,903 | A | 2/1990 | Wright et al. |
| 4,900,904 | A | 2/1990 | Wright et al. |
| 4,900,941 | A | 2/1990 | Barton et al. |
| 4,901,241 | A | 2/1990 | Schneck |
| 4,908,770 | A | 3/1990 | Breault et al. |
| 4,910,686 | A | 3/1990 | Chang et al. |
| 4,919,325 | A | 4/1990 | Culver |
| 4,933,849 | A | 6/1990 | Connell et al. |
| 4,934,846 | A | 6/1990 | Gilham et al. |
| 4,941,091 | A | 7/1990 | Breault et al. |
| 4,947,333 | A | 8/1990 | Sansone et al. |
| 4,993,752 | A | 2/1991 | Juszak |
| 4,998,204 | A | 3/1991 | Sansone et al. |
| 5,025,141 | A | 6/1991 | Bolan |
| 5,044,669 | A | 9/1991 | Berry |
| 5,058,008 | A | 10/1991 | Schumacher |
| 5,065,000 | A | 11/1991 | Pusic |
| 5,067,088 | A | 11/1991 | Schneiderhan |
| 5,075,862 | A | 12/1991 | Doeberl et al. |
| 5,077,792 | A | 12/1991 | Herring |
| 5,085,470 | A | 2/1992 | Peach et al. |
| 5,091,771 | A | 2/1992 | Bolan et al. |
| 5,111,030 | A | 5/1992 | Brasington et al. |
| 5,119,306 | A | 6/1992 | Metelits et al. |
| 5,136,647 | A | 8/1992 | Haber et al. |
| 5,141,128 | A | 8/1992 | Pippin |
| 5,150,407 | A | 9/1992 | Chan |
| 5,200,903 | A | 4/1993 | Gilham et al. |
| 5,202,834 | A | 4/1993 | Gilham |
| 5,233,657 | A | 8/1993 | Gunther |
| 5,237,506 | A | 8/1993 | Horbal et al. |
| 5,239,168 | A | 8/1993 | Dursty, Jr. et al. |
| 5,289,540 | A | 2/1994 | Jones |
| 5,316,208 | A | 5/1994 | Petkovsek |
| 5,319,562 | A | 6/1994 | Whitehouse |
| 5,323,323 | A | 6/1994 | Gilham |
| 5,323,465 | A | 6/1994 | Avarne |
| 5,341,505 | A | 8/1994 | Whitehouse |
| 5,360,628 | A | 11/1994 | Butland |
| 5,375,172 | A | 12/1994 | Chrosny |
| 5,384,886 | A | 1/1995 | Rourke |
| 5,388,049 | A | 2/1995 | Sansone et al. |
| 5,390,849 | A | 2/1995 | Frissard |
| 5,410,642 | A | 4/1995 | Hakamatsuka et al. |
| 5,423,573 | A | 6/1995 | de Passille |
| 5,425,586 | A | 6/1995 | Berson |
| 5,437,441 | A | 8/1995 | Tuhro et al. |
| 5,439,721 | A | 8/1995 | Pedroli et al. |
| 5,449,200 | A | 9/1995 | Andric et al. |
| 5,454,038 | A | 9/1995 | Cordery et al. |
| 5,471,925 | A | 12/1995 | Heinrich et al. |
| 5,476,420 | A | 12/1995 | Manning |
| 5,490,077 | A | 2/1996 | Freytag |
| 5,494,445 | A | 2/1996 | Sekiguchi et al. |
| 5,501,393 | A | 3/1996 | Walz |
| 5,502,304 | A | 3/1996 | Berson et al. |
| 5,510,992 | A | 4/1996 | Kara |
| 5,524,995 | A | 6/1996 | Brookner et al. |
| 5,554,842 | A | 9/1996 | Connell et al. |
| 5,569,317 | A | 10/1996 | Sarada et al. |
| 5,573,277 | A | 11/1996 | Petkovsek |
| 5,583,779 | A | 12/1996 | Naclerio et al. |
| 5,598,970 | A | 2/1997 | Mudry et al. |
| 5,600,562 | A | 2/1997 | Guenther |
| 5,601,313 | A | 2/1997 | Konkol et al. |
| 5,602,743 | A | 2/1997 | Fraytag |
| 5,606,507 | A | 2/1997 | Kara |
| 5,606,613 | A | 2/1997 | Lee et al. |
| 5,612,541 | A | 3/1997 | Hoffmann et al. |
| 5,612,889 | A | 3/1997 | Pintsov et al. |
| 5,615,123 | A | 3/1997 | Davidson et al. |
| 5,615,312 | A | 3/1997 | Kohler |
| 5,617,519 | A | 4/1997 | Herbert |
| 5,619,571 | A | 4/1997 | Sandstrom et al. |
| 5,623,546 | A | 4/1997 | Hardy et al. |
| 5,635,694 | A | 6/1997 | Tuhro |
| 5,649,118 | A | 7/1997 | Carlisle et al. |
| 5,650,934 | A | 7/1997 | Manduley |
| 5,651,238 | A | 7/1997 | Belec et al. |
| 5,655,023 | A | 8/1997 | Cordery et al. |
| 5,666,215 | A | 9/1997 | Fredlund et al. |
| 5,666,284 | A | 9/1997 | Kara |
| 5,682,318 | A | 10/1997 | Kara |
| 5,696,829 | A | 12/1997 | Cordery et al. |
| 5,706,502 | A | 1/1998 | Foley et al. |
| 5,708,422 | A | 1/1998 | Blonder et al. |
| 5,715,314 | A | 2/1998 | Payne et al. |
| 5,717,596 | A | 2/1998 | Bernard et al. |
| 5,717,597 | A | 2/1998 | Kara |
| 5,717,980 | A | 2/1998 | Oka et al. |
| 5,729,460 | A | 3/1998 | Plett et al. |
| 5,737,729 | A | 4/1998 | Denman |
| 5,742,683 | A | 4/1998 | Lee et al. |
| 5,768,132 | A | 6/1998 | Cordery et al. |
| 5,774,886 | A | 6/1998 | Kara |
| 5,778,076 | A | 7/1998 | Kara et al. |
| 5,791,553 | A | 8/1998 | Fabel |
| 5,796,834 | A | 8/1998 | Whitney et al. |

(56) References Cited

U.S. PATENT DOCUMENTS

| | | | | |
|---|---|---|---|---|
| 5,801,364 | A | 9/1998 | Kara et al. | |
| 5,801,944 | A | 9/1998 | Kara | |
| 5,805,810 | A | 9/1998 | Maxwell | |
| 5,812,991 | A | 9/1998 | Kara | |
| 5,819,240 | A | 10/1998 | Kara | |
| 5,822,739 | A | 10/1998 | Kara | |
| 5,825,893 | A | 10/1998 | Kara | |
| 5,836,617 | A | 11/1998 | Beaudoin et al. | |
| 5,860,068 | A | 1/1999 | Cook | |
| 5,884,277 | A | 3/1999 | Khosla | |
| 5,902,439 | A | 5/1999 | Pike et al. | |
| 5,923,406 | A | 7/1999 | Brasington et al. | |
| 5,923,885 | A | 7/1999 | Johnson et al. | |
| 5,924,738 | A | 7/1999 | Konkol et al. | |
| 5,929,415 | A | 7/1999 | Berson | |
| 5,932,139 | A | 8/1999 | Oshima et al. | |
| 5,936,865 | A | 8/1999 | Pintsov et al. | |
| 5,936,885 | A | 8/1999 | Morita et al. | |
| 5,946,671 | A | 8/1999 | Herring | |
| 5,960,418 | A | 9/1999 | Kelly et al. | |
| 5,983,209 | A | 11/1999 | Kara | |
| 5,995,985 | A | 11/1999 | Cai | |
| 6,005,945 | A | 12/1999 | Whitehouse | |
| 6,010,069 | A | 1/2000 | Debois | |
| 6,010,156 | A | 1/2000 | Block | |
| 6,026,385 | A | 2/2000 | Harvey et al. | |
| 6,033,751 | A | 3/2000 | Kline | |
| 6,061,670 | A | 5/2000 | Brand | |
| D434,438 | S | 11/2000 | Kara | |
| 6,142,380 | A | 11/2000 | Sansone et al. | |
| 6,155,476 | A | 12/2000 | Fabel | |
| 6,173,888 | B1 | 1/2001 | Fabel | |
| 6,175,826 | B1 | 1/2001 | Malandra, Jr. et al. | |
| 6,181,433 | B1 | 1/2001 | Hayama et al. | |
| 6,184,534 | B1 | 2/2001 | Stephany et al. | |
| 6,199,055 | B1 | 3/2001 | Kara et al. | |
| 6,208,980 | B1 | 3/2001 | Kara | |
| 6,209,779 | B1 | 4/2001 | Fabel | |
| 6,233,565 | B1 | 5/2001 | Lewis et al. | |
| 6,234,694 | B1 | 5/2001 | Brookner | |
| 6,244,763 | B1 | 6/2001 | Miller | |
| 6,249,777 | B1 | 6/2001 | Kara et al. | |
| 6,282,524 | B1 | 8/2001 | Kramer | |
| 6,296,404 | B1 | 10/2001 | Pierce et al. | |
| 6,311,240 | B1 | 10/2001 | Boone et al. | |
| 6,322,192 | B1 | 11/2001 | Walker | |
| 6,370,844 | B1 | 4/2002 | Stricker | |
| 6,385,504 | B1 | 5/2002 | Pintsov et al. | |
| 6,397,328 | B1 | 5/2002 | Pitchenik et al. | |
| 6,415,983 | B1 | 7/2002 | Ulvr et al. | |
| 6,427,021 | B1 | 7/2002 | Fischer et al. | |
| 6,428,219 | B1 | 8/2002 | Stier et al. | |
| 6,430,543 | B1 | 8/2002 | Lee et al. | |
| 6,438,530 | B1 | 8/2002 | Heiden et al. | |
| 6,461,063 | B1 | 10/2002 | Miller et al. | |
| 6,505,179 | B1 | 1/2003 | Kara | |
| 6,505,980 | B1 | 1/2003 | Allday | |
| 6,523,014 | B1 | 2/2003 | Pauschinger | |
| 6,526,391 | B1 | 2/2003 | Cordery et al. | |
| 6,527,178 | B1 * | 3/2003 | Gordon ............ | G07B 17/00435 235/375 |
| 6,532,452 | B1 | 3/2003 | Pintsov et al. | |
| 6,594,374 | B1 | 7/2003 | Beckstrom et al. | |
| 6,595,412 | B2 | 7/2003 | Manduley | |
| 6,655,579 | B1 | 12/2003 | Delman et al. | |
| 6,671,813 | B2 | 12/2003 | Ananda | |
| 6,692,031 | B2 | 2/2004 | McGrew | |
| 6,697,822 | B1 | 2/2004 | Armatis et al. | |
| 6,701,304 | B2 | 3/2004 | Leon | |
| 6,722,563 | B1 | 4/2004 | Johnson et al. | |
| 6,735,575 | B1 | 5/2004 | Kara | |
| 6,820,201 | B1 | 11/2004 | Lincoln et al. | |
| 6,834,112 | B1 | 12/2004 | Brickell | |
| 6,834,273 | B1 | 12/2004 | Sansone et al. | |
| 6,853,990 | B1 * | 2/2005 | Thiel ................ | G07B 17/00314 705/401 |
| 6,868,406 | B1 | 3/2005 | Ogg et al. | |
| 6,902,265 | B2 | 6/2005 | Critelli et al. | |
| 6,904,168 | B1 | 6/2005 | Steinberg et al. | |
| 6,946,960 | B2 | 9/2005 | Sisson et al. | |
| 6,948,660 | B2 | 9/2005 | Critelli et al. | |
| 7,028,902 | B2 | 4/2006 | Xu et al. | |
| 7,039,214 | B2 | 5/2006 | Miller et al. | |
| 7,069,253 | B2 | 6/2006 | Leon | |
| 7,085,725 | B1 | 8/2006 | Leon | |
| 7,117,363 | B2 | 10/2006 | Lincoln et al. | |
| 7,127,434 | B2 | 10/2006 | Burningham | |
| 7,149,726 | B1 | 12/2006 | Lingle et al. | |
| 7,162,460 | B2 | 1/2007 | Cleckler et al. | |
| 7,182,259 | B2 | 2/2007 | Lubow et al. | |
| 7,191,158 | B2 | 3/2007 | Ogg | |
| 7,191,336 | B2 | 3/2007 | Zeller et al. | |
| 7,194,957 | B1 | 3/2007 | Leon et al. | |
| 7,201,305 | B1 | 4/2007 | Correa | |
| 7,222,236 | B1 | 5/2007 | Pagel | |
| 7,225,170 | B1 | 5/2007 | Ryan, Jr. | |
| 7,233,929 | B1 | 6/2007 | Lingle et al. | |
| 7,234,645 | B2 | 6/2007 | Silverbrook et al. | |
| 7,243,842 | B1 | 7/2007 | Leon et al. | |
| 7,266,531 | B2 | 9/2007 | Pintsov et al. | |
| 7,305,556 | B2 | 12/2007 | Slick et al. | |
| 7,337,152 | B1 | 2/2008 | Gawler | |
| 7,343,357 | B1 | 3/2008 | Kara | |
| 7,396,048 | B2 | 7/2008 | Janetzke et al. | |
| 7,418,599 | B2 | 8/2008 | Peters | |
| 7,458,612 | B1 | 12/2008 | Bennett | |
| 7,509,291 | B2 | 3/2009 | McBride et al. | |
| 7,548,612 | B2 | 6/2009 | Weissman et al. | |
| 7,577,618 | B2 | 8/2009 | Raju et al. | |
| 7,711,650 | B1 | 5/2010 | Kara | |
| 7,778,924 | B1 | 8/2010 | Ananda | |
| 7,784,090 | B2 | 8/2010 | Lord et al. | |
| 7,828,223 | B1 | 11/2010 | Leon et al. | |
| 7,831,518 | B2 | 11/2010 | Montgomery et al. | |
| 7,831,524 | B2 | 11/2010 | Whitehouse | |
| 7,840,492 | B2 | 11/2010 | Leung et al. | |
| 7,954,709 | B1 | 6/2011 | Leon et al. | |
| 7,963,437 | B1 | 6/2011 | McBride et al. | |
| 8,100,324 | B1 | 1/2012 | Leon | |
| 8,155,976 | B1 | 4/2012 | Rendich et al. | |
| 8,204,835 | B1 | 6/2012 | Ogg | |
| 8,240,579 | B1 | 8/2012 | Bennett | |
| 8,285,651 | B1 | 10/2012 | Leon et al. | |
| 8,612,361 | B1 | 12/2013 | Bussell et al. | |
| 8,626,673 | B1 | 1/2014 | Bennett | |
| 8,775,331 | B1 | 7/2014 | Tsuie et al. | |
| 9,208,620 | B1 | 12/2015 | Bortnak et al. | |
| 9,911,246 | B1 | 3/2018 | McBride et al. | |
| 9,978,185 | B1 | 5/2018 | Bortnak et al. | |
| 2001/0007086 | A1 | 7/2001 | Rogers et al. | |
| 2001/0020234 | A1 | 9/2001 | Shah et al. | |
| 2001/0022060 | A1 | 9/2001 | Robertson et al. | |
| 2001/0032881 | A1 | 10/2001 | Wells et al. | |
| 2001/0042052 | A1 | 11/2001 | Leon | |
| 2001/0054153 | A1 | 12/2001 | Wheeler et al. | |
| 2002/0023057 | A1 | 2/2002 | Goodwin et al. | |
| 2002/0032668 | A1 | 3/2002 | Kohler et al. | |
| 2002/0032784 | A1 | 3/2002 | Darago et al. | |
| 2002/0033598 | A1 | 3/2002 | Beasley | |
| 2002/0046195 | A1 | 4/2002 | Martin et al. | |
| 2002/0052841 | A1 | 5/2002 | Guthrie et al. | |
| 2002/0070149 | A1 | 6/2002 | Schererz et al. | |
| 2002/0073039 | A1 | 6/2002 | Ogg et al. | |
| 2002/0073050 | A1 | 6/2002 | Gusler et al. | |
| 2002/0073052 | A1 * | 6/2002 | Katikaneni ...... | G07B 17/00508 705/408 |
| 2002/0082935 | A1 | 6/2002 | Moore et al. | |
| 2002/0083020 | A1 | 6/2002 | Leon | |
| 2002/0083021 | A1 | 6/2002 | Ryan et al. | |
| 2002/0099652 | A1 | 7/2002 | Herzen et al. | |
| 2002/0143431 | A1 | 10/2002 | Sansone | |
| 2002/0149195 | A1 | 10/2002 | Beasley | |
| 2002/0190117 | A1 | 12/2002 | Manduley | |

(56) References Cited

U.S. PATENT DOCUMENTS

2003/0002709 A1 1/2003 Wu
2003/0029914 A1 2/2003 Hortman et al.
2003/0030270 A1 2/2003 Franko et al.
2003/0037008 A1 2/2003 Raju et al.
2003/0059635 A1 3/2003 Naasani
2003/0078893 A1 4/2003 Shah et al.
2003/0080182 A1 5/2003 Gunther
2003/0088426 A1 5/2003 Benson et al.
2003/0101143 A1 5/2003 Montgomery et al.
2003/0101147 A1 5/2003 Montgomery et al.
2003/0101148 A1 5/2003 Montgomery et al.
2003/0115162 A1 6/2003 Konick
2003/0138345 A1 7/2003 Schwabe
2003/0140017 A1 7/2003 Patton et al.
2003/0144972 A1 7/2003 Cordery et al.
2003/0167241 A1 9/2003 Gilham
2003/0182155 A1 9/2003 Nitzan et al.
2003/0187666 A1 10/2003 Leon
2003/0204477 A1 10/2003 McNett
2003/0230436 A1* 12/2003 Garde ................ G01G 19/4148 177/25.15
2003/0233276 A1 12/2003 Pearlman et al.
2003/0236709 A1 12/2003 Hendra et al.
2004/0000787 A1 1/2004 Vig et al.
2004/0002926 A1 1/2004 Coffy et al.
2004/0048503 A1 3/2004 Mills et al.
2004/0064422 A1 4/2004 Leon
2004/0070194 A1 4/2004 Janetzke et al.
2004/0083179 A1 4/2004 Sesek et al.
2004/0089482 A1 5/2004 Ramsden et al.
2004/0112950 A1 6/2004 Manduley et al.
2004/0122776 A1 6/2004 Sansone
2004/0122779 A1 6/2004 Stickler et al.
2004/0125413 A1 7/2004 Cordery
2004/0128264 A1* 7/2004 Leung ................ G07B 17/0008 705/402
2004/0174012 A1 9/2004 Hagen
2004/0185827 A1 9/2004 Parks
2004/0185882 A1 9/2004 Gecht et al.
2004/0186811 A1 9/2004 Gullo et al.
2004/0200902 A1 10/2004 Ishioroshi
2004/0215523 A1 10/2004 Wulff et al.
2004/0215581 A1 10/2004 Lord et al.
2004/0215583 A1 10/2004 Elliott
2004/0220935 A1 11/2004 McGraw et al.
2004/0236938 A1 11/2004 Callaghan
2004/0241424 A1 12/2004 Barbera-Guillem
2004/0254898 A1 12/2004 Parker et al.
2005/0033653 A1 2/2005 Eisenberg et al.
2005/0065892 A1 3/2005 Ryan et al.
2005/0065896 A1 3/2005 Kummer et al.
2005/0065897 A1 3/2005 Ryan et al.
2005/0071296 A1 3/2005 Lepkofker
2005/0071297 A1 3/2005 Kara
2005/0080751 A1 4/2005 Burningham
2005/0082818 A1 4/2005 Mertens
2005/0087605 A1 4/2005 Auslander et al.
2005/0114276 A1 5/2005 Hunter et al.
2005/0116047 A1* 6/2005 Lu ...................... G06K 19/0776 235/487
2005/0119786 A1 6/2005 Kadaba
2005/0137949 A1 6/2005 Rittman et al.
2005/0171869 A1 8/2005 Minnocci
2005/0171920 A1* 8/2005 Dutta ............... G07B 17/00193 705/401
2005/0192899 A1 9/2005 Reardon
2005/0192911 A1 9/2005 Mattern
2005/0195214 A1 9/2005 Reid et al.
2005/0209913 A1 9/2005 Wied et al.
2005/0237203 A1 10/2005 Burman et al.
2005/0256811 A1 11/2005 Pagel et al.
2005/0278263 A1 12/2005 Hollander et al.
2005/0278266 A1 12/2005 Ogg et al.
2006/0000648 A1* 1/2006 Galtier ............. G07B 17/00467 177/25.15
2006/0020505 A1 1/2006 Whitehouse
2006/0036556 A1* 2/2006 Knispel .............. G01G 19/4148 705/407
2006/0116971 A1 6/2006 Beckstrom et al.
2006/0118631 A1 6/2006 Lubow et al.
2006/0122947 A1 6/2006 Poulin
2006/0136347 A1 6/2006 Reichelsheimer et al.
2006/0173796 A1 8/2006 Kara
2006/0190418 A1 8/2006 Huberty et al.
2006/0220298 A1 10/2006 Fairweather et al.
2006/0238334 A1 10/2006 Mangan et al.
2006/0259390 A1 11/2006 Rosenberger
2006/0283943 A1 12/2006 Ostrowski et al.
2006/0287096 A1 12/2006 O'Kelley, II et al.
2006/0293907 A1 12/2006 Castineiras
2007/0005518 A1 1/2007 Beckstrom et al.
2007/0011995 A1 1/2007 Weaver et al.
2007/0017985 A1 1/2007 Lapstun et al.
2007/0033110 A1 2/2007 Philipp et al.
2007/0073587 A1 3/2007 Walker et al.
2007/0078795 A1 4/2007 Chatte
2007/0080228 A1 4/2007 Knowles et al.
2007/0100672 A1 5/2007 McBride et al.
2007/0174215 A1 7/2007 Morel
2007/0179853 A1 8/2007 Feige et al.
2007/0185726 A1 8/2007 Stickler et al.
2007/0198441 A1 8/2007 Kara
2007/0253350 A1 11/2007 Tung et al.
2007/0255664 A1 11/2007 Blumberg et al.
2008/0046384 A1 2/2008 Braun et al.
2009/0125561 A1 5/2009 Garcia
2009/0164273 A1* 6/2009 Rothman ............... G06Q 10/08 705/330
2009/0164392 A1 6/2009 Raju et al.
2009/0171848 A1 7/2009 Wronski, Jr. et al.
2009/0171861 A1 7/2009 Horree et al.
2009/0222354 A1 9/2009 Murphy et al.
2010/0298662 A1 11/2010 Yu et al.
2010/0312627 A1 12/2010 Khechef et al.
2011/0015935 A1 1/2011 Montgomery et al.
2011/0022544 A1 1/2011 Kim et al.
2011/0029429 A1 2/2011 Whitehouse
2011/0071944 A1 3/2011 Heiden et al.
2011/0145107 A1 6/2011 Greco
2011/0225180 A1 9/2011 Liao et al.
2012/0008766 A1 1/2012 Robertson et al.
2012/0159603 A1 6/2012 Queck
2012/0233252 A1 9/2012 Vats et al.
2012/0240204 A1 9/2012 Bhatnagar et al.

FOREIGN PATENT DOCUMENTS

EP 153816 A2 9/1985
EP 0282359 A2 9/1988
EP 0507562 A2 10/1992
EP 0571259 A1 11/1993
EP 0596706 A1 5/1994
EP 0658861 A1 6/1995
EP 0782111 7/1997
EP 0900830 A1 3/1999
EP 0927958 A2 7/1999
EP 0927963 A2 7/1999
EP 1096429 A2 5/2001
EP 1525994 A2 4/2005
FR 2580844 A1 10/1986
GB 2246929 A 2/1992
GB 2251210 A 7/1992
GB 2271452 A 4/1994
JP 63-147673 6/1988
JP 04-284558 B2 10/1992
JP 05-132049 5/1993
JP 09-508220 8/1997
JP 11-249205 9/1999
JP 2000-105845 A 4/2000
JP 2005132049 A 5/2005
JP 2005-215905 A 8/2005
WO WO-88/01818 A1 3/1988

(56) References Cited

FOREIGN PATENT DOCUMENTS

| | | | |
|---|---|---|---|
| WO | WO-94/27258 | A1 | 11/1994 |
| WO | WO-95/17732 | | 6/1995 |
| WO | WO-1995/19016 | A1 | 7/1995 |
| WO | WO-97/14085 | | 4/1997 |
| WO | WO-97/40472 | A1 | 10/1997 |
| WO | WO-98/14907 | A2 | 4/1998 |
| WO | WO-98/14909 | | 4/1998 |
| WO | WO-98/57302 | A1 | 12/1998 |
| WO | WO-98/57460 | A1 | 12/1998 |
| WO | WO-02/063517 | A2 | 8/2002 |
| WO | WO-03/039051 | A2 | 5/2003 |
| WO | WO-03/083784 | A1 | 10/2003 |
| WO | WO-2005/042645 | A2 | 5/2005 |
| WO | WO-2005/060590 | A2 | 7/2005 |

OTHER PUBLICATIONS

Brown, B., "Internet Postage Services," PC Magazine, Jun. 6, 2000, p. 133, Ziff-Davis Publishing Company, 1 page.
"Zazzle® Offers Zazzle Custom Stamps™ for Business," May 17, 2006, https://www.zazzle.com/about/press/releases?pr=12624, 2 pages.
Porter, William, "Canadians Take to Vanity Stamps in Very Big Way," Denver Post, Jul. 9, 2000, 2 pages.
Derrick, J. "The Meter is Running," Office Systems, vol. 11 No. 9, Sep. 1994, 6 pages.
Computergram International, "U.S. Postal Service to Introduce PC Postage Plans Today," Aug. 9, 1999, No. 3720, 1 page.
Terrell, "Licking Stamps: A PC and a Printer Will End Trips to the Post Office," U.S. News & World Report, Sep. 28, 1998, vol. 125, No. 12, 4 pages.
"Miniature, Coin-Shaped Chip is Read or Written with a Touch," News Release, Dallas Semiconductor, Jul. 1991, 9 pages.
Anonymous, "Automated Indicia Detection System From Parascript Protects Postage Revenue for Postal Operators, Cracks Down on Fraud:—Parascript StampVerify Simplifies Complex Task of Automatically Locating and Verifying Different Types of Indicia on Envelope Images -," PR Newswire, New York, Sep. 18, 2007, 2 pages.
"Mobile Postage stamps via text message announced", http://telecoms.cytalk.com/2011/03/mobile-postage-stamps-via-text-messages-announced/, CY.TALK Telecoms News Blog, Mar. 14, 2011 in Telecoms, Texting, pp. 1-9.
Mobile Postage Stamps via Text Messages Announced, Phone Reviews, Mobile Phones, News, Mar. 11, 2011, pp. 1-3.
"Domestic Mail Manual Section 604," United States Postal Service, Aug. 31, 2005, 45 pages.
Alexander, K.L., "U.S. Stamps Pay Tribute to Starry-Eyed Jurors," Final Edition, Calgary Herald, Calgary, Alberta, Canada, Sep. 14, 2007, 2 pages.
Ford, C., "Frequent Flyer Programs," Australian Accountant, 63,1, Feb. 1993, pp. 52-58, 7 pages.
"Endicia Announces PictureItPostage™," Jun. 6, 2005, http://www.endicia.com/-/media/Files/About%20Us/Press%20Room/Endicia_pr05-06-06.ashx>, 2 pages.
Ralph, J. "What's Selling: From Bricks and Mortar to Bricks and Clicks," Playthings Magazine, Feb. 1, 2003, 4 pages.
Menezes, A.J. et al., "Handbook of Applied Cryptography," CRC Press LLC, 1997 (Excerpt—Cover pages and pp. 512-515), 22 pages.
"Information-Based Indicia Program (IBIP) Performance Criteria for Information-Based Indicia and Security Architecture for Closed IBI Postage Metering Systems (PCIBI-C)," Jan. 12, 1999, The United States Postal Service (USPS), 49 pages.
Stamps: Beyond Elvis, May 15, 1994, New York Times Archives, 2 pages.
Minnick, Robert, "Postage Imprinting Apparatus and Methods for Use With a Computer Printer", Apr. 27, 1995, 71 pages.
Office Action dated Mar. 13, 2007 for JP 515,253/97; with English language translation (4 pages).
Office Action issued for Japanese Patent Application No. 515,253/1997, dated Apr. 21, 2009; 5 pages (with English language translation).
Appeal Decision dated Apr. 20, 2010 for U.S. Appl. No. 10/991,241 to Kara, filed Nov. 17, 2004, and entitled "System and Method for Generating Personalized Postage Indicia," 9 pages.
Examiner's Answer to Appeal Brief dated Feb. 19, 2009 for U.S. Appl. No. 10/991,241 to Kara, filed Nov. 17, 2004, and entitled "System and Method for Generating Personalized Postage Indicia," 14 pages.
Final Office Action dated Dec. 10, 2008 for U.S. Appl. No. 10/994,914 to McBride et al., filed Nov. 22, 2004, and entitled "Customized Computer-Based Value- Bearing Item Quality Assurance," 25 pages.
Final Office Action dated Dec. 4, 2009 for U.S. Appl. No. 11/644,458 to Leon, filed Dec. 20, 2006, and entitled "Systems and Methods for Creating and Providing Shape- Customized, Computer-Based, Value-Bearing Items," 17 pages.
Final Office Action dated Jan. 26, 2009 for U.S. Appl. No. 10/994,728 to Huebner et al., filed Nov. 22, 2004, and entitled "Printing of Computer-Based Value-Bearing Items," 13 pages.
Final Office Action dated Jan. 31, 2006 for U.S. Appl. No. 10/991,241 to Kara, filed Nov. 17, 2004, and entitled "System and Method for Generating Personalized Postage Indicia," 13 pages.
Final Office Action dated Jun. 23, 2009 for U.S. Appl. No. 11/114,964 to Clem et al., filed Apr. 25, 2005, and entitled "Quality Assurance of Image-Customization of Computer-Based Value-Bearing Items," 11 pages.
Final Office Action dated Jun. 30, 2010 for U.S. Appl. No. 11/114,964 to Clem et al., filed Apr. 25, 2005, and entitled "Quality Assurance of Image-Customization of Computer-Based Value-Bearing Items," 23 pages.
Final Office Action dated Mar. 15, 2010 for U.S. Appl. No. 10/994,914 to McBride et al., filed Nov. 22, 2004, and entitled "Customized Computer-Based Value-Bearing Item Quality Assurance," 31 pages.
Final Office Action dated Apr. 21, 2010 for U.S. Appl. No. 11/435,453 to Clem, filed May 16, 2006, and entitled "Rolls of Image-Customized Value-Bearing Items and Systems and Methods for Providing Rolls of Image-Customized Value-Bearing Items," 12 pages.
Final Office Action dated Mar. 16, 2010 for U.S. Appl. No. 10/994,728 to Huebner et al., filed Nov. 22, 2004, and entitled "Printing of Computer-Based Value-Bearing Items," 13 pages.
Final Office Action dated Mar. 4, 2009 for U.S. Appl. No. 10/994,698 to Leon et al., filed Nov. 22, 2004, and entitled "Image Customization of Computer-Based Value-Bearing Items," 12 pages.
Final Office Action dated May 11, 2010 for U.S. Appl. No. 10/994,698 to Leon et al., filed Nov. 22, 2004, and entitled "Image Customization of Computer-Based Value-Bearing Items," 18 pages.
Final Office Action dated Nov. 4, 2010 for U.S. Appl. No. 11/644,458 to Leon, filed Dec. 20, 2006, and entitled "Systems and Methods for Creating and Providing Shape-Customized, Computer-Based, Value-Bearing Items," 22 pages.
Inverview Summary dated Sep. 2, 2010 for U.S. Appl. No. 11/644,458 to Leon, filed Dec. 20, 2006, and entitled "Systems and Methods for Creating and Providing Shape-Customized, Computer-Based, Value-Bearing Items," 4 pages.
Non-Final Office Action dated Apr. 16, 2009 for U.S. Appl. No. 11/644,458 to Leon, filed Dec. 20, 2006, and entitled "Systems and Methods for Creating and Providing Shape-Customized, Computer-Based, Value-Bearing Items," 15 pages.
Non-Final Office Action dated Apr. 17, 2008 for U.S. Appl. No. 10/994,914 to McBride et al., filed Nov. 22, 2004, and entitled "Customized Computer-Based Value-Bearing Item Quality Assurance," 19 pages.
Non-Final Office Action dated Aug. 11, 2009 for U.S. Appl. No. 11/435,453 to Clem., filed May 16, 2006, and entitled "Rolls of Image-Customized Value-Bearing Items and Systems and Methods for Providing Rolls of Image-Customized Value-Bearing Items," 9 pages.

(56) References Cited

OTHER PUBLICATIONS

Non-Final Office Action dated Aug. 19, 2008 for U.S. Appl. No. 10/994,698 to Leon et al., filed Nov. 22, 2004, and entitled "Image Customization of Computer-Based Value-Bearing Items," 16 pages.
Non-Final Office Action dated Aug. 19, 2009 for U.S. Appl. No. 10/994,728 to Huebner et al., filed Nov. 22, 2004, and entitled "Printing of Computer-Based Value-Bearing Items," 13 pages.
Non-Final Office Action dated Aug. 26, 2009 for U.S. Appl. No. 10/994,914 to McBride et al., filed Nov. 22, 2004, and entitled "Customized Computer-Based Value-Bearing Item Quality Assurance," 29 pages.
Non-Final Office Action dated Aug. 3, 2009 for U.S. Appl. No. 10/994,698 to Leon et al., filed Nov. 22, 2004, and entitled "Image Customization of Computer-Based Value-Bearing Items," 13 pages.
Non-Final Office Action dated Dec. 12, 2007 for U.S. Appl. No. 11/635,871 to McBride et al., filed Dec. 8, 2006, and entitled "Formatting Value-Bearing Item Indicia," 5 pages.
Non-Final Office Action dated Dec. 23, 2009 for U.S. Appl. No. 11/114,964 to Clem et al., filed Apr. 25, 2005, and entitled "Quality Assurance of Image-Customization of Computer-Based Value-Bearing Items," 21 pages.
Non-Final Office Action dated Dec. 31, 2007 for U.S. Appl. No. 10/991,241 to Kara, filed Nov. 17, 2004, and entitled "System and Method for Generating Personalized Postage Indicia," 11 pages.
Non-Final Office Action dated Dec. 9, 2009 for U.S. Appl. No. 11/729,239 to Leon et al., filed Mar. 28, 2007, and entitled "Computer-Based Value-Bearing Item Customization Security," 6 pages.
Non-Final Office Action dated Jul. 12, 2007 for U.S. Appl. No. 10/991,241 to Kara, filed Nov. 17, 2004, and entitled "System and Method for Generating Personalized Postage Indicia," 11 pages.
Non-Final Office Action dated Jul. 19, 2005 for U.S. Appl. No. 10/991,241 to Kara, filed Nov. 17, 2004, and entitled "System and Method for Generating Personalized Postage Indicia," 9 pages.
Non-Final Office Action dated Jul. 21, 2010 for U.S. Appl. No. 10/994,914 to McBride et al., filed Nov. 22, 2004, and entitled "Customized Computer-Based Value-Bearing Item Quality Assurance," 33 pages.
Non-Final Office Action dated Jul. 7, 2008 for U.S. Appl. No. 10/991,241 to Kara, filed Nov. 17, 2004, and entitled "System and Method for Generating Personalized Postage Indicia," 12 pages.
Non-Final Office Action dated Feb. 23, 2011 for U.S. Appl. No. 12/943,519 to Clem, filed Nov. 10, 2010, and entitled "Rolls of Image-Customized Value-Bearing Items and Systems and Methods for Providing Rolls of Image-Customized Value-Bearing Items," 8 pages.
Non-Final Office Action dated Jun. 19, 2007 for U.S. Appl. No. 11/635,871 to McBride et al., filed Dec. 8, 2006, and entitled "Formatting Value-Bearing Item Indicia," 5 pages.
Non-Final Office Action dated Aug. 3, 2009 for U.S. Appl. No. 11/353,690 to Kara, filed Feb. 14, 2006, and entitled "System and Method for Validating Postage," 19 pages.
Non-Final Office Action dated May 29, 2008 for U.S. Appl. No. 10/994,728 to Huebner et al., filed Nov. 22, 2004, and entitled "Printing of Computer-Based Value-Bearing Items," 11 pages.
Non-Final Office Action dated May 7, 2010 for U.S. Appl. No. 11/644,458 to Leon, filed Dec. 20, 2006, and entitled "Systems and Methods for Creating and Providing Shape-Customized, Computer-Based, Value-Bearing Items," 18 pages.
Non-Final Office Action dated Nov. 26, 2008 for U.S. Appl. No. 11/114,964 to Clem et al., filed Apr. 25, 2005, and entitled "Quality Assurance of Image-Customization of Computer-Based Value-Bearing Items," 9 pages.
Non-Final Office Action dated Oct. 31, 2006 for U.S. Appl. No. 10/991,241 to Kara, filed Nov. 17, 2004, and entitled "System and Method for Generating Personalized Postage Indicia," 11 pages.
Notice of Abandonment dated Jun. 30, 2010 for U.S. Appl. No. 10/991,241 to Kara, filed Nov. 17, 2004, and entitled "System and Method for Generating Personalized Postage Indicia," 2 pages.
Notice of Allowance dated Aug. 5, 2010 for U.S. Appl. No. 11/435,453 to Clem, filed May 16, 2006, and entitled "Rolls of Image-Customized Value-Bearing Items and Systems and Methods for Providing Rolls of Image-Customized Value-Bearing Items," 11 pages.
Notice of Allowance dated Dec. 2, 2010 for U.S. Appl. No. 10/994,698 to Leon et al., filed Nov. 22, 2004, and entitled " Image Customization of Computer-Based Value-Bearing Items," 5 pages.
Notice of Allowance dated Feb. 3, 2011 for U.S. Appl. No. 11/114,964 to Clem et al., filed Apr. 25, 2005, and entitled "Quality Assurance of Image-Customization of Computer-Based Value-Bearing Items," 7 pages.
Notice of Allowance dated Jan. 5, 2007 for U.S. Appl. No. 10/994,768 to Leon et al., filed Nov. 22, 2004, and entitled "Computer-Based Value-Bearing Item Customization Security," 7 pages.
Notice of Allowance dated Jul. 15, 2008 for U.S. Appl. No. 11/635,871 to McBride et al., filed Dec. 8, 2006, and entitled "Formatting Value-Bearing Item Indicia," 7 pages.
Notice of Allowance dated Jun. 24, 2010 for U.S. Appl. No. 11/729,239 to Leon et al., filed Mar. 28, 2007, and entitled "Computer-Based Value-Bearing Item Customization Security," 6 pages.
Notice of Allowance dated Nov. 17, 2008 for U.S. Appl. No. 11/635,871 to McBride et al., filed Dec. 8, 2006, and entitled "Formatting Value-Bearing Item Indicia," 7 pages.
Notice of Allowance dated Nov. 24, 2008 for U.S. Appl. No. 10/197,044 to Raju et al., filed Jul. 16, 2002, and entitled "Generic Value Bearing Item Labels," 7 pages.
U.S. Appl. No. 10/994,698 to Leon et al., filed Nov. 22, 2004, and entitled "Image Customization of Computer-Based Value-Bearing Items," 126 pages.
U.S. Appl. No. 10/994,728 to Huebner et al., filed Nov. 22, 2004, and entitled "Printing of Computer-Based Value-Bearing Items," 122 pages.
U.S. Appl. No. 10/994,914 to McBride et al., filed Nov. 22, 2004, and entitled "Customized Computer-Based Value-Bearing Item Quality Assurance," 131 pages.
U.S. Appl. No. 11/114,964 to Clem et al., filed Apr. 25, 2005, and entitled "Quality Assurance of Image-Customization of Computer-Based Value-Bearing Items," 122 pages.
U.S. Appl. No. 11/435,453 to Clem, filed May 16, 2006, and entitled "Rolls of Image-Customized Value-Bearing Items and Systems and Methods for Providing Rolls of Image-Customized Value-Bearing Items," 69 pages.
U.S. Appl. No. 11/644,458 to Leon, filed Dec. 20, 2006, and entitled "Systems and Methods for Creating and Providing Shape-Customized, Computer-Based, Value-Bearing Items," 77 pages.
U.S. Appl. No. 11/729,239 to Leon et al., filed Mar. 28, 2007 and entitled "Computer-Based Value-Bearing Item Customization Security," 131 pages.
U.S. Appl. No. 12/316,240 to Leon, filed Dec. 9, 2008, and entitled "Systems and Methods for Facilitating Replacement of Computer-Based Value-Bearing Items," 158 pages.
U.S. Appl. No. 12/500,970 to Clem, filed Jul. 10, 2009, and entitled "Automatic Guarantee Delivery Tracking and Reporting for United States Postal Service Postage Refunds for Paid Computer-Based Postage," 70 pages.
U.S. Appl. No. 12/943,519 to Clem, filed Nov. 10, 2010, and entitled "Rolls of Image-Customized Value-Bearing Items and Systems and Methods for Providing Rolls of Image-Customized Value-Bearing Items," 65 pages.
U.S. Appl. No. 13/038,029 to Leon et al., filed Mar. 1, 2011 and entitled "Image-Customization of Computer-Based Value-Bearing Items," 131 pages.
U.S. Appl. No. 13/081,356 to Leon et al., filed Apr. 6, 2011 and entitled "Computer-Based Value-Bearing Item Customization Security," 136 pages.
Unpublished U.S. Appl. No. 12/103,496 to Bortnak et al., filed Apr. 15, 2008 and entitled "Systems and Methods for Activation of Postage Indicia at Point of Sale," 40 pages.
Unpublished U.S. Appl. No. 11/509,309 to Leon filed Aug. 24, 2006 and entitled "Invisible Fluorescent Ink Mark," 15 pages.
Unpublished U.S. Appl. No. 12/030,739 to McBride et al. filed Feb. 13, 2008 and entitled "Systems and Methods for Distributed Activation of Postage," 35 pages.

(56) References Cited

OTHER PUBLICATIONS

International Search Report attached to PCT Application WO/88/01818, dated Nov. 30, 1987, 2 pages.
International Search Report issued for Application PCT/US96/16366, dated Jun. 13, 1997, 9 pages.
Feare, Tom, "Shipping System Saves $2 Million Yearly," Modern Materials Handling, Aug. 2000, 55, 9; pages A6-A7.
Martorelli, Business Reply Mail, Winton M. Blount Postal History Symposium, Sep. 2011, 13 pages.
Pulfer, M., "Mail in wrong slot?," Cincinnati Enquirer, Cincinati, Ohio, C.1, Jan. 6, 2023.
Bleumer, G. Electronic Postage Systems, Springer, 2007, 263 pages.

* cited by examiner

FIG. 4
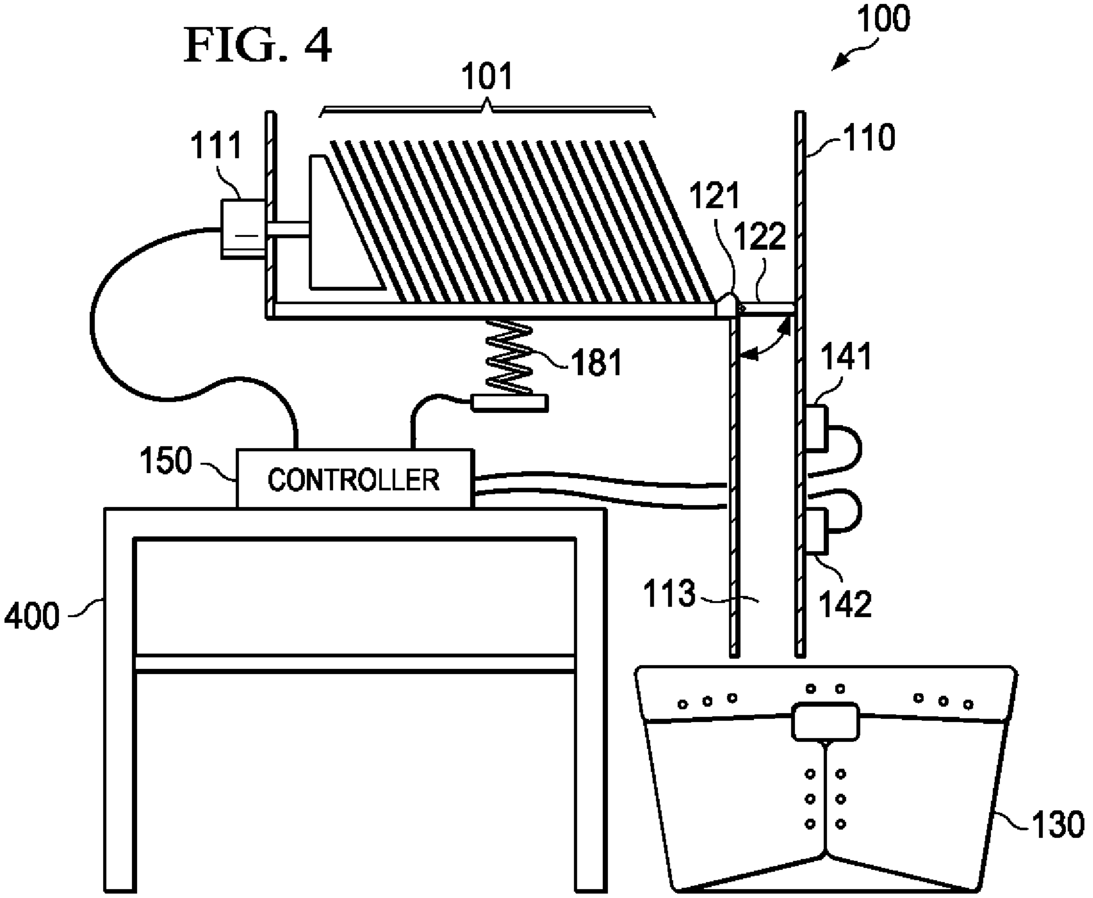
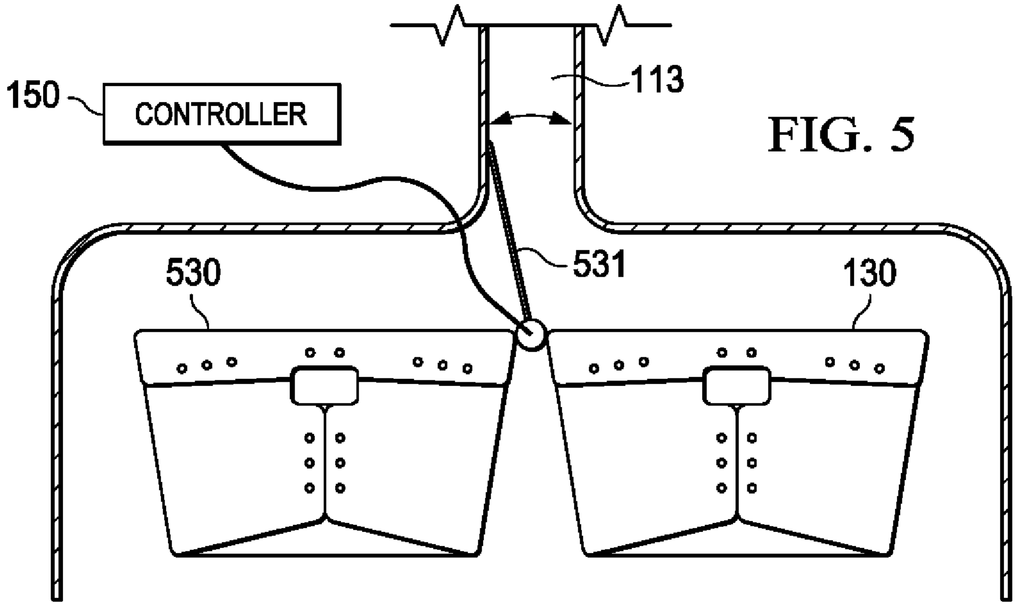
FIG. 5

SYSTEMS AND METHODS UTILIZING GRAVITY FEED FOR POSTAGE METERING

CROSS-REFERENCE TO RELATED APPLICATIONS

The present application is a continuation of U.S. patent application Ser. No. 15/876,017 entitled "SYSTEMS AND METHODS UTILIZING GRAVITY FEED FOR POSTAGE METERING," filed Jan. 19, 2018, which is a division of U.S. patent application Ser. No. 12/344,080 entitled "SYSTEMS AND METHODS UTILIZING GRAVITY FEED FOR POSTAGE METERING," filed Dec. 24, 2008 and is related to commonly assigned U.S. patent application Ser. No. 12/103,496 entitled "SYSTEMS AND METHODS FOR ACTIVATION OF POSTAGE INDICIA AT POINT OF SALE," filed Apr. 15, 2008 and issued May 22, 2018 as U.S. Pat. No. 9,978,185, U.S. patent application Ser. No. 12/030,739 entitled "SYSTEMS AND METHODS FOR DISTRIBUTED ACTIVATION OF POSTAGE," filed Feb. 13, 2008 and issued Aug. 6, 2019 as U.S. Pat. No. 10,373,398, U.S. patent application Ser. No. 10/991,241 entitled "SYSTEM AND METHOD FOR GENERATING POSTAGE INDICIA," filed Nov. 17, 2004, abandoned, U.S. patent application Ser. No. 11/713,533 entitled "SYSTEM AND METHOD FOR PRINTING MULTIPLE POSTAGE INDICIA," filed Mar. 2, 2007 and issued Mar. 13, 2012 as U.S. Pat. No. 8,135,651, U.S. patent application Ser. No. 11/509,309 entitled "INVISIBLE FLUORESCENT INK MARK," filed Aug. 24, 2006, abandoned, and U.S. patent application Ser. No. 11/729,148 entitled "COMPUTER-BASED VALUE-BEARING ITEM CUSTOMIZATION SECURITY," filed Mar. 27, 2007 and issued Jun. 7, 2011 as U.S. Pat. No. 7,954,709, the disclosures of which are hereby incorporated herein by reference in their entirety.

TECHNICAL FIELD

The invention relates generally to postage metering and, more particularly, to utilizing gravity feed for postage metering.

BACKGROUND OF THE INVENTION

Systems for processing mail items and applying postage indicia thereto (postage indicia metering systems) have been in use in large businesses for years, such as for use in mailing large volumes of letters generated daily by such businesses. In more recent years, postage indicia metering systems have become sufficiently affordable so as to be adopted by small businesses and even home users, such as for use in somewhat large mailing campaigns, daily correspondence, etc. Accordingly, various configurations of postage indicia metering systems have been developed.

Although various configurations of postage indicia metering systems have been provided in an attempt to address particular needs and demands of users, all such postage indicia metering systems have required moving of mail items or transfer media to and from a postage indicia printing area. For example, high volume and other postage indicia metering systems have utilized conveyers and/or other feed mechanisms to transport mail items to a postage indicia printing area, orient the mail items for postage indicia printing, and to transport the mail items from the postage indicia printing area. Less complicated postage indicia metering systems, such as low volume postage indicia metering systems often used in homes and small businesses, utilize manual means by which to transport mail items to a postage indicia printing area, orient the mail items for postage indicia printing, and to transport the mail items from the postage indicia printing area.

In addition to providing for moving of mail items or transfer mediums to and from a postage indicia printing area, such postage indicia metering systems have provided for various forms of associated processing and handling. For example, postage indicia metering systems have been provided with mechanisms for folding documents, stuffing envelopes, weighing mail items, sealing envelopes, sorting mail items, applying postage indicia, etc.

The foregoing mechanisms are often quite complicated, involving the use of many parts and requiring precise timing and/or tolerances for the proper operation thereof. Likewise, such mechanisms are typically quite expensive, adding to the base cost of an associated postage indicia meter. Accordingly, mail item feed and handling mechanisms generally increase the complexity and size of the postage indicia metering systems and reduce the reliability of the postage indicia metering systems.

BRIEF SUMMARY OF THE INVENTION

The present invention is directed to systems and methods which utilize gravity feed for mail item movement in postage metering operations. Accordingly, gravity feed techniques are implemented to transport mail items for or in association with postage metering operations, thereby reducing or eliminating the use of complicated, costly, and/or relatively large mail item feed and handling mechanisms.

Embodiments of the invention provide for gravity drop feeding mail items into a portion of a postage metering system for metering operations, such as to activate or apply postage indicia thereto. According to various gravity drop feed configurations, mail items are singulated for gravity drop feeding, such as through the use of one or more of a singulator boss, a singulator shutter, a singulator lift, a singulator gate, a singulator clutch, and/or the like. Gravity drop feed configurations of embodiments additionally or alternatively accept manual drop fed mail items.

Other embodiments of the invention provide for gravity drop exit of mail items from a portion of a postage metering system after metering operations, such as activation or application of postage indicia thereto. According to various gravity drop exit configurations, gravity drop exiting of mail items from a processing area after processing of the mail item is provided serially, such as through the use of one or more of a vertical item stack, a horizontal item stack, and/or the like. Additionally or alternatively, gravity drop exit configurations of embodiments may utilize one or more singulators, such as those discussed above with respect to gravity drop feed configurations.

Postage metering operations as performed by embodiments of the invention may comprise scanning and activation of preprinted tokens. For example, unassigned (e.g., not yet activated or not yet representing postage value) tokens (e.g., information based indicia (IBI) barcodes) suitable for later use as postage indicia may be provided on mail items such that postage metering operations provided by embodiments of the present invention activate such unassigned tokens as valid or "live" postage indicia. Thereafter, the postage indicia may be used to post the associated mail item. Embodiments of the invention may provide a marking or other indication (e.g., print a symbol, develop a bi-stable mark preexisting on the mail item, etc.) on processed mail items to provide an indication that a token has been activated as a postage indicia.

Postage metering operations according to alternative embodiments of the invention may print postage indicia. For example, mail items having no postage indicia or token suitable for activation as postage indicia may have postage indicia (e.g., IBI barcodes) printed thereon through postage metering operations provided by embodiments of the present invention.

Irrespective of whether postage indicia is activated or printed by the postage metering operations, various information may be printed as part of or in association with postage indicia according to embodiments of the invention. For example, information in addition or alternative to indicating activation of postage indicia may be provided by embodiments which operate to activate preprinted tokens as postage indicia. Similarly, information in addition to postage indicia may be provided by embodiments which operate to print postage indicia. Such information may comprise postage amount, time information, weight information, meter information, facing mark, address information, and/or the like.

Printing of postage indicia and/or providing other markings according to embodiments of the invention may occur during gravity feeding a mail item and/or at other times during mail item processing. For example, printing or developing a mark or other information may be provided while a mail item is traveling in a gravity feed fall. Additionally or alternatively, printing or developing a mark or other information may be provided wile a mail item is at rest, such as in a feed or collector tray.

Embodiments of the invention operate to provide processing in addition to or in the alternative to the aforementioned postage indicia activation or printing and mail item marking operations. Accordingly, embodiments provide for operation ancillary to postage metering operations, such as weighing, sorting, etc. For example, embodiments of the present invention implement weighing techniques which leverage gravity drop configurations, such as to implement feed tray differential weight determinations, singulator weight determinations, etc.

Embodiments of the invention provide for mail item gravity drop control for mail items which are gravity drop fed into a portion of a postage metering system for metering operations, such as to activate or apply postage indicia thereto. According to various mail item gravity drop control configurations, mail item movement is controlled (e.g., slowed, temporarily stopped, etc.) to facilitate postage metering operations (e.g., information scanning, token activation, information printing, postage indicia generation, postage indicia printing, etc.). Additionally or alternatively, various mail item gravity drop control configurations the orientation of mail items is controlled (e.g., mail item facing, mail item positioning with respect to postage metering apparatus, mail item alignment, etc.) to facilitate postage metering operations.

Mail item gravity drop controllers of embodiments of the present invention may be implemented in various forms. For example, mail item gravity drop controllers of embodiments may comprise one or more moving parts, such as to provide a pendulum gravity drop controller configuration, a dashpot gravity drop controller configuration, a continuous shelf elevator gravity drop controller, etc. Mail item gravity drop controllers of embodiments may comprise no moving parts, such as through the use of a slope change gravity drop controller, a friction interface gravity drop controller, etc. Embodiments of the invention may implement the foregoing mail item gravity drop controllers alone or in combinations, including combinations of moving part and non-moving part mail item gravity drop controllers, as desired.

Embodiments of mail item gravity drop controllers provide functionality in addition to mail item gravity drop control. For example, mail item gravity drop controllers of embodiments provide mail item weighing in addition to providing mail item movement and/or orientation control.

Various forms of mail item gravity drop feeding may be accommodated by gravity drop controllers of embodiments of the present invention. For example, mail items may be drop fed (e.g., introduced into a gravity drop feed chute) through automated singulation and drop control means. Additionally or alternatively, mail items may be drop fed (e.g., introduced into a gravity drop feed chute) through manual mail item dropping. Further detail with respect to such forms of mail item gravity drop feeding is provided in the above referenced patent application entitled "Systems and Methods Utilizing Gravity Feed for Postage Metering."

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIG. 4 shows a postage metering system adapted according to embodiments of the invention;

FIG. 5 shows an embodiment of an output bin configuration;

DETAILED DESCRIPTION OF THE INVENTION

Figure 1A:
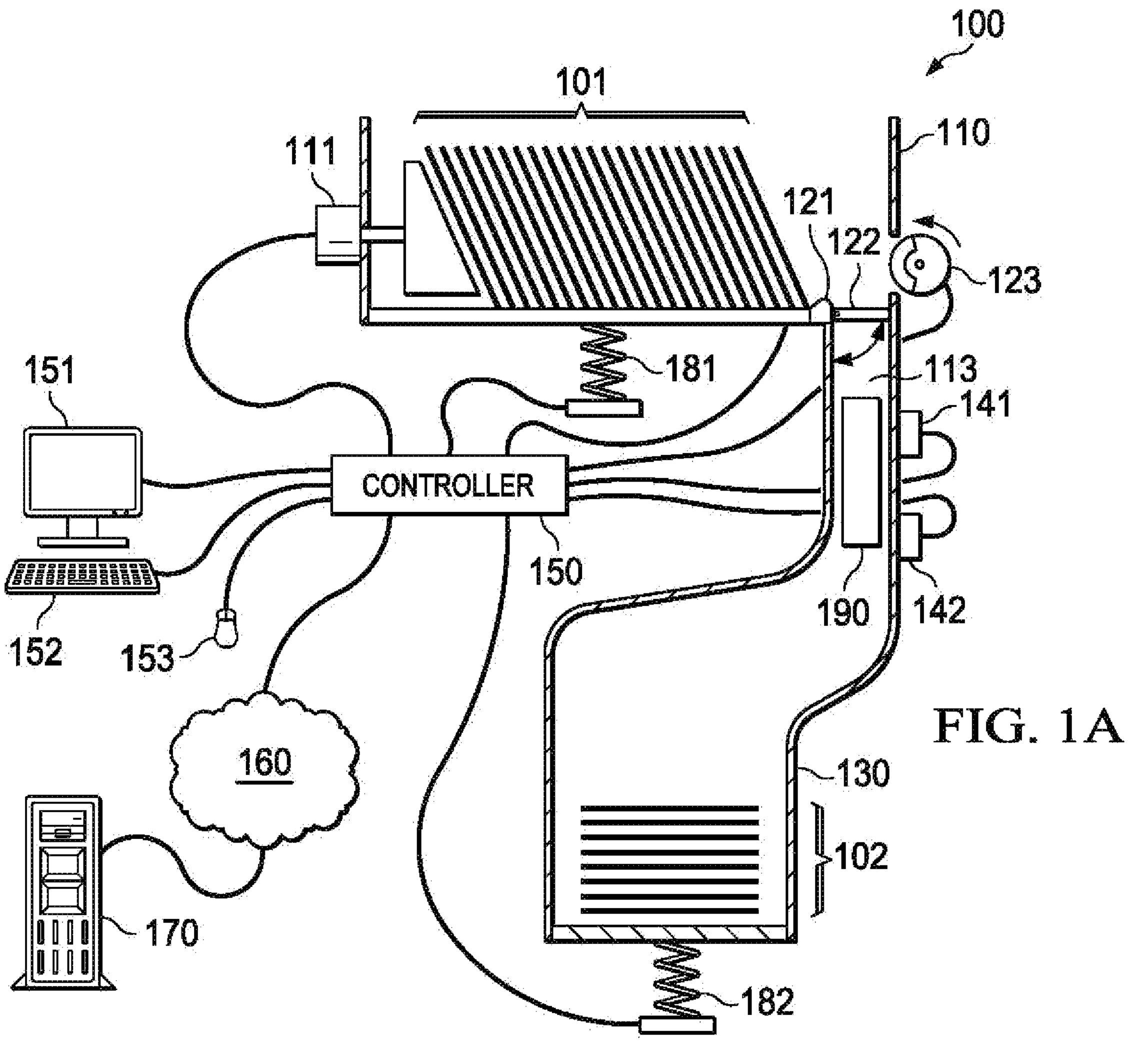
FIGS. 1A and 1B show a postage metering system adapted according to embodiments of the invention.
Figure 1B:
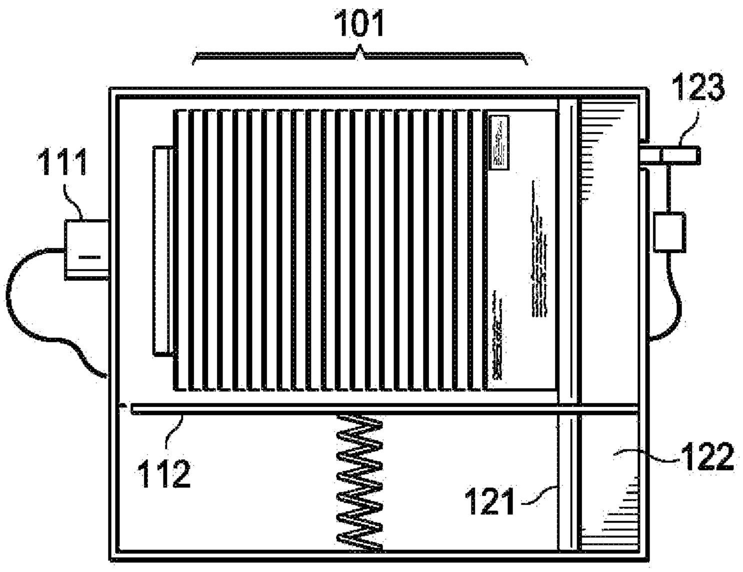

Directing attention to FIGS. 1A and 1B, a postage metering system having a gravity drop feed configuration according to embodiments of the present invention is shown as system 100. System 100 stores mail items 101 for postage metering in tray 110 and provides mail items 102, which have had postage metering operations performed with respect thereto, to bin 130. It should be appreciated that, although particular embodiments and configurations of the present invention are shown and described in order to facilitate an understanding of the concepts of the present invention, various different embodiments and configurations may be implemented in keeping with the concepts of the present invention.

Tray 110 of the illustrated embodiment includes bias mechanisms 111 and 112 to maintain a desired orientation of mail items 101 while awaiting postage metering operations and/or provide a bias force to mail items for movement, singulation, etc. For example, bias mechanism 112 may comprise a spring and fence configuration to hold mail items 101 in a substantially justified vertical stack and/or to persuade mail items 101 towards a side of tray 110 adapted to singulate or otherwise manipulate the mail items for operation as described herein. Bias mechanism 111 may comprise a stepper motor, jack screw, and wedge fence configuration to encourage mail items 101 towards gravity drop feed chute 113. Operation of bias mechanism 111 may, for example, be under control of controller 150 to provide movement of mail items 101 at a rate consistent with postage metering processing by other parts of system 100. Embodiments of the invention may implement various different configurations of bias mechanisms 111 and 112, if desired. For example, rather than a controlled stepper motor configuration of bias mechanism 111, embodiments of the present invention may implement a spring and damper configuration, sloped tray surface configuration, vibratory locomotion configuration, and/or the like to mechanically control movement of mail items 101 towards gravity drop feed chute 113.

Controller 150 may comprise a processor-based system, such as a computer having a central processing unit (CPU), memory, and appropriate input/output (I/O) devices and interfaces, operable under control of an instruction set defining operation as described herein. For example, controller 150 may comprise a computer having a processor from the PENTIUM family of processors available from Intel Corporation, Santa Clara, California. Various input/output interfaces may be provided with respect to controller 150, such as to provide a robust user interface, singulator apparatus interface, scale interface, scanner interface, printer interface, network interface, etc. For example, display 151 (which may provide for input through a touch screen), keyboard 152, and/or pointing device 153 may be utilized to provide a user interface for operation as described herein.

System 100 of the illustrated embodiment includes singulators in tray 110 to facilitate singulation of mail items 101 for postage metering operations by system 100. Specifically, singulation boss 121, singulation shutter 122, and singulation clutch 123 are shown disposed in tray 110. One or more of these and/or other singulators may be used alone or in combination to provide desired singulation of mail items 101 for postage metering operations as described herein. Apparatus used to provide singulation according to embodiments of the invention may provide additional functionality, if desired. For example, a singulator, such as singulation shutter 122, may provide a scale operable to weigh mail items resting thereon.

Singulation boss 121 preferably provides a protrusion or other perturbation in one or more surface of tray 110 to facilitate singulation of a mail item of mail items 101. For example, as bias mechanism 111 causes movement of vertically oriented mail items 101 toward gravity drop feed chute 113, the movement of a leading mail item of mail items 101 may be altered with respect to the remaining mail items sufficiently to facilitate singulation of that leading mail item. Such altered movement may result, for example, through the movement of vertically oriented mail items 101 toward gravity drop feed chute 113 being impeded by singulation boss 121. As bias pressure (e.g., as provided by bias mechanism 111) on mail items 101 stopped by their movement toward gravity drop feed chute 113 by singulation boss 121 increases, the leading mail item is forced past singulation boss 121. Movement of the remaining mail items continues to be restricted by singulation boss 121 until bias pressure again builds to a point that a next leading mail item is forced past singulation boss 121. Providing vertically oriented mail items 101 with a slight off-vertical tilt, as shown in FIG. 1A, may be used to facilitate singulation of mail items by singulation boss 121.

Singulation shutter 122 preferably provides a door or other controllable occlusion of gravity drop feed chute 113 to facilitate singulation of a mail item of mail items 101. For example, as bias mechanism 111 causes movement of vertically oriented mail items 101 toward gravity drop feed chute 113, singulation shutter 122 may open and close sufficiently to facilitate singulation of a leading mail item. Controller 150 may control actuation of singulation shutter 122, preferably in coordination with operation of bias mechanism 111, to singulate mail items dropping into gravity drop feed chute 113. Accordingly, singulation shutter 122 of embodiments includes a servo or other actuator operable under control of controller 150.

Singulation clutch 123 preferably provides a rotating gripping surface or other controllable friction interface to facilitate singulation of a mail item of mail items 101. For example, as bias mechanism 111 causes movement of vertically oriented mail items 101 toward gravity drop feed chute 113, a friction surface of singulation clutch 123 may interface with a surface of a leading mail item. Rotational movement of singulation clutch 123 preferably causes the leading mail item to be singulated and encouraged into gravity drop feed chute 113. Such movement of singulation clutch 123 may be under control of controller 150.

Although system 100 is shown as including singulation boss 121, singulation shutter 122, and singulation clutch 123 in order to aid in understanding various embodiments of the invention, postage metering systems adapted according to embodiments of the invention may comprise different configurations and numbers of singulators. For example, any of singulation boss 121, singulation shutter 122, and singulation clutch 123 may be provided alone in embodiments of system 100. Likewise, combinations of singulators different than that shown may be utilized, such as to provide singulation boss 121 in combination with singulation shutter 122 without singulation clutch 123, to provide singulation boss 121 in combination with singulation clutch 123 without singulation shutter 122, or to provide singulation shutter 122 with singulation clutch 123 without singulation boss 121.

Figure 2:
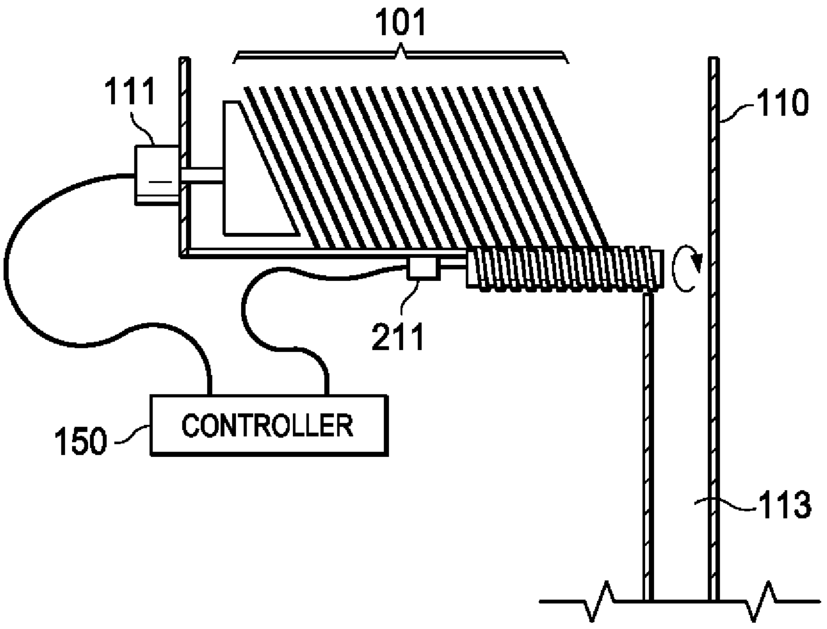
FIG. 2 shows an alternative embodiment of singulation apparatus.

Moreover, different singulator implementations may be used according to embodiments of the invention. For example, FIG. 2 shows singulation gear 211 which interfaces with individual mail items to singulate the mail items. Specifically, mail items 101 are singulated between worm gear teeth of the illustrated embodiment. The illustrated worm gear may be controllably rotated by a stepper motor or other actuator operating under control of controller 150, preferably in coordination with operation of bias mechanism 111, to singulate mail items dropping into gravity drop feed chute 113.

Figure 3A:
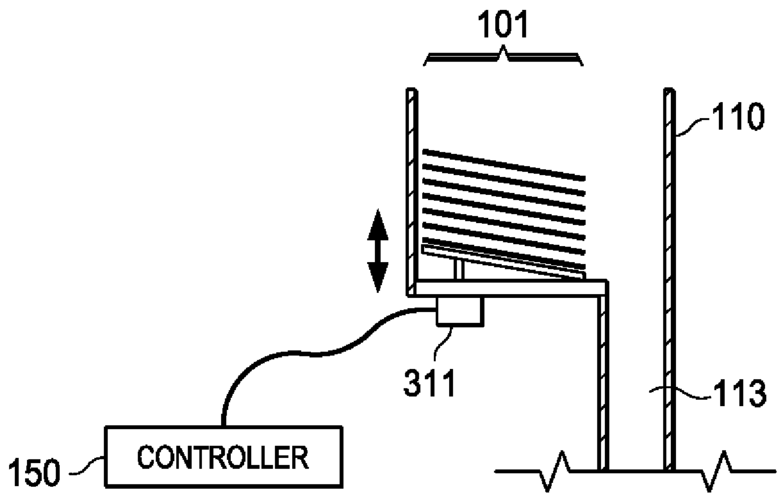
FIGS. 3A-3D show embodiments disposing mail items in various orientations prior to postage metering operations.
Figure 3B:
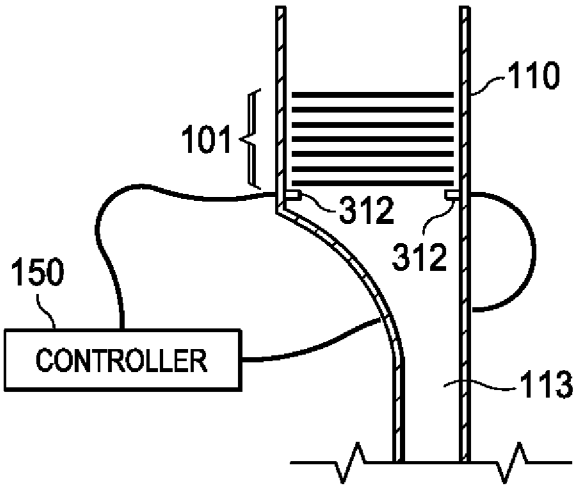

Although embodiments have been described herein with respect to mail items being vertically oriented in tray 110 prior to singulation, it should be appreciated that the concepts of the present invention are not limited to any particular orientation of mail items. For example, although still provided in a vertical orientation, mail items may be stood on end, lengthwise according to embodiments of the invention, such as to facilitate orientation control as the mail items fall through gravity drop feed chute 113. FIGS. 3A-3D show embodiments wherein the orientation of mail items being stored for postage metering operations are other than vertical. For example, FIGS. 3A and 3B show mail items 101 oriented horizontally.

FIG. 3A shows horizontally oriented mail items 101 resting on singulation tilt bed 311. In operation, singulation tilt bed 311 operates to tilt horizontally oriented mail items 101 to encourage a mail item thereof to fall into gravity drop feed chute 113. Singulation tilt bed 311 may utilize a linear actuator or other actuator, perhaps in combination with a vibratory mechanism, operating under control of controller 150 to singulate mail items dropping into gravity drop feed chute 113.

FIG. 3B shows horizontally oriented mail items 101 resting on singulation gate 312. In operation, singulation gate 312 operates to interface with edges of a bottom mail item of mail items 101 to facilitate singulation of the mail item of mail items 101. For example, as gravity, perhaps assisted by a bias mechanism such as bias mechanism 111 of FIGS. 1A and 1B, pushes horizontally oriented mail items 101 toward gravity drop feed chute 113, the movement of a bottom mail item of mail items 101 may be altered with respect to the remaining mail items sufficiently to facilitate singulation of that bottom mail item. Such altered movement may result, for example, through the movement of horizontally oriented mail items 101 toward gravity drop feed chute 113 being impeded by singulation gate 312. As pressure (e.g., as provided by gravity and/or a bias mechanism) on mail items 101 stopped by their movement toward gravity drop feed chute 113 by singulation gate 312 increases, the leading mail item is forced past singulation gate 312. Movement of the remaining mail items continues to be restricted by singulation gate 312 until downward pressure again builds to a point that a next leading mail item is forced past singulation gate 312.

In addition to or in the alternative to using downward pressure between the edge of a mail item against singulation gate 312 to provide singulation, one or more actuators may be utilized with respect to singulation gate 312 to facilitate singulation of mail items. For example, linear actuators or other actuators operating under control of controller 150 may cause singulation gate 312 to retract, pivot, or otherwise open to facilitate passing of a mail item therethrough. Such opening of singulation gate 312 may continue to provide a gate opening which is smaller than a face of the mail items, although perhaps providing a gate opening very close to the size of the mail item face, to facilitate singulation without allowing multiple mail items to pass. Manipulation of singulation gate 312 may additionally or alternatively be provided rapidly to discourage multiple mail items from passing.

Figure 3C:
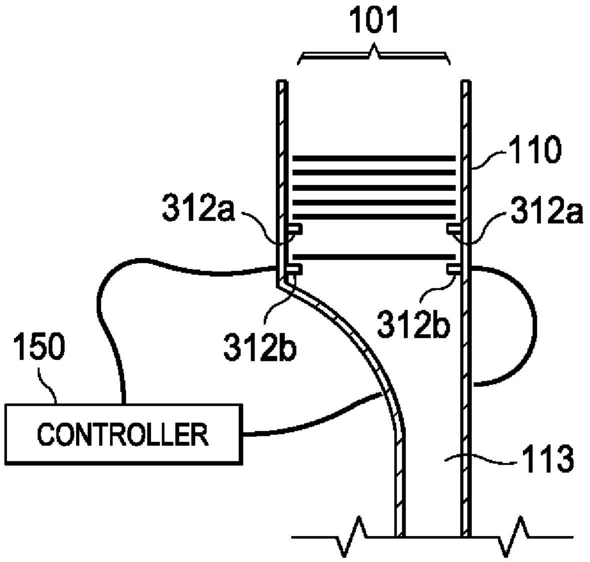

Embodiments of the invention may utilize a plurality of singulation gates to facilitate singulation of mail items. FIG. 3C shows an embodiment having a plurality of singulation gates, shown as singulation gates 312*a* and 321*b*, providing singulation of horizontally oriented mail items. Either or both of singulation gates 312*a* and 312*b* may comprise fixed protrusions to form a singulation gate and/or protrusions having actuators in communication therewith to form a singulation gate. For example, singulation gate 312*a* may comprise fixed protrusions wherein gravity and/or other bias force pushes horizontally oriented mail items 101 toward gravity drop feed chute 113 and the movement of a mail item interfacing with gate 312*a* is altered with respect to the remaining mail items sufficiently to facilitate singulation of that bottom mail item. Singulation gate 312*b* may comprise protrusions in communication with actuators to control release of the singulated mail item into gravity drop feed chute 113. Alternatively, singulation gates 312*a* and 312*b* may both comprise protrusions in communication with actuators, wherein controller 150 coordinates movement of the protrusions to cause singulation gates 312*a* and 312*b* to cooperate to singulate mail items of mail items 101.

Figure 3D:
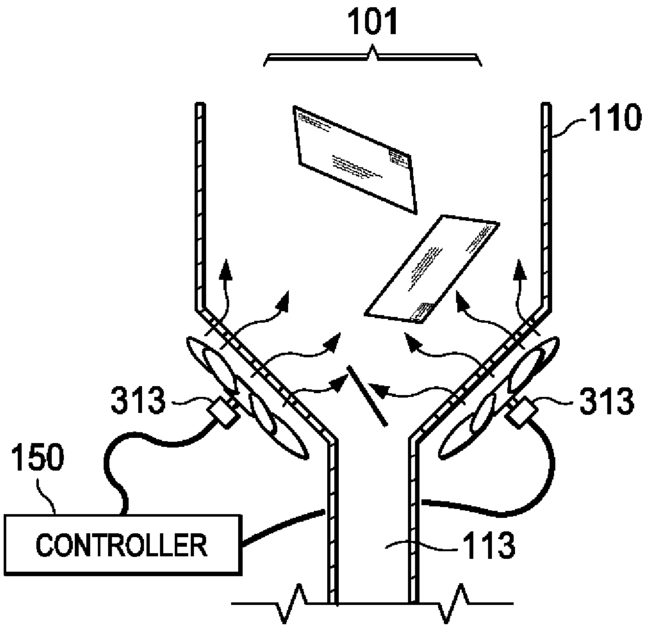

FIG. 3D shows randomly oriented mail items 101 supported by singulation air 313. In operation, singulation air 313 operates to support a plurality of mail items 101 in a volume of air, wherein the mail items are free to tumble and change orientations such that individual mail items will fall into gravity drop feed chute 113 as the orientation of the mail item allows the mail item to sufficiently escape the upward pressure provided by singulation air 313. Singulation air 313 may be provided by fans or other air movement apparatus, such as may be controlled by controller 150.

As with the singulators discussed with respect to FIGS. 1A and 1B, the singulators of FIGS. 3A-3D may be provided in different configurations and combinations for use in postage metering systems adapted according to embodiments of the invention. For example, singulation air 313 may be provided in combination with singulation shutter 122 to provide singulation of mail items according to embodiments of the invention.

It should be appreciated that embodiments of the invention may not include a singulator apparatus. For example, where manual gravity drop feeding is used, as described below, no apparatus to provide singulation of mail items may be provided. Of course, one or more singulator apparatus may be used in combination with manual gravity drop feeding according to embodiments of the invention.

Regardless of how singulation is accomplished, operation according to preferred embodiments of the invention provides a gravity drop feed rate with respect to mail items of mail items 101 into gravity drop feed chute 113 suitable to accommodate subsequent postage metering operations. For example, the gravity drop feed rate of a postage indicia activation configuration may be controlled so as to provide sufficient spacing between mail items to allow token scanning, database access and updating, and postage indicia activation by controller 150 while providing a rate sufficiently high to provide desired processing speeds. Similarly, the gravity drop feed rate of a postage indicia printing configuration may be controlled so as to provide sufficient spacing between mail items to allow generation and printing of postage indicia while providing a rate sufficiently high to provide desired processing speeds.

Referring again to FIG. 1A, in operation according to the illustrated embodiment singulated mail items pass through gravity drop feed chute 113 wherein one or more postage metering operation is performed. Accordingly, scanner 141 and marker 142 are disposed in gravity drop feed chute 113 to interact with mail items for postage metering operations. Gravity drop feed chute 113 is preferably sized and/or shaped to accommodate mail items, to facilitate gravity induced movement from tray 110 to bin 130, to maintain a desired orientation of mail items, to encourage desired interaction between mail items and postage metering apparatus, etc. Accordingly, gravity drop feed chute 113 of embodiments may be sufficiently narrow along one axis to encourage a surface of mail items to face postage metering apparatus such as scanner 141 and marker 142. As will better be appreciated from the discussion provided below regarding providing gravity feed mail item control, gravity drop feed chute 113 may include bends, curves, members, guides, etc. to facilitate desired manipulation of mail items passing therethrough.

Scanner 141 of embodiments may comprise various scanner configurations, such as an image scanner, a camera based scanner, a barcode scanner, a magnetic ink character recognition (MICR) reader, a radio frequency identification (RFID) scanner, optical character recognition (OCR) system, and/or the like. Where tokens or other printed matter are used which are not visible in natural light or which are configured to be bi-stable (e.g., although initially invisible can be rendered permanently visible), scanners used according to the present invention may be adapted for use therewith, such as by substituting or adding an illumination lamp operable to radiate a desired wavelength of light (e.g., ultraviolet, infrared, etc.). However, lamps used with respect to many commonly available scanners are broad-spectrum enough to cause many ultraviolet and other inks to fluoresce, thereby making it possible in many circumstances to use more traditional optical scanner configurations even with respect to specialized indicia configurations. Detail with respect to indicia which are not visible in natural light as may be utilized according to embodiments of the invention is provided in the above referenced patent application entitled "Invisible Fluorescent Ink Mark."

Marker 142 of embodiments may comprise various configurations operable to provide markings on mail items, such as to provide an indication that a token thereon has been activated, to print postage indicia and/or other information (e.g., postage value, address information, postnet barcode, etc.). Accordingly, marker 142 may comprise a radiation source (e.g., lamp, radio frequency transmitter, heating element, etc.) for activating pre-printed marks and/or may comprise a print element (e.g., ink nozzle, dot matrix head, toner delivery system, etc.) for printing marks. For example, where one or more bi-stable marks are included in association with unassigned tokens, marker 142 may operate to "develop" the mark (or an appropriate one of a plurality of marks) through exposure to a particular wavelength of light, an appropriate amount of heat, an appropriate frequency of radio frequency energy, an appropriate chemical, a suitable magnetic field, etc., upon activation of the token as a postage indicium. Detail with respect to developing marks to show activation is provided in the above referenced patent application entitled "Systems and Methods for the Distributed Activation of Postage." The foregoing bi-stable marks need not be utilized to provide the foregoing information or other information on the mail items at the time of activation according to embodiments of the invention. For example, a mark printed by marker 142 may provide symbols or information indicating activation of the postage indicia.

It should be appreciated that information may be added to the mail items by marker 142 during postage metering operations according to embodiments of the invention. For example, an amount of the postage value, postal class, etc. may be printed on the mail items. Where unassigned tokens are denomination agnostic, for example, a postage value consistent with that selected by the user may be printed upon a mail item by marker 142. Likewise, where tokens are not already present on a mail item for activation, postage indicia may be generated under control of controller 150 and printed on mail items by marker 142.

In a postage indicia activation embodiment unassigned (e.g., not yet activated or not yet representing postage value) tokens (e.g., IBI barcodes) suitable for use as postage indicia are made available to users. Users may, for example, purchase envelope stock, label stock, documents, and/or other items used to generate mail items having unassigned tokens thereon. Similarly, users may cause such unassigned tokens to be printed on such stock, such as at a time of generating a mail item. The unassigned tokens are preferably activated as valid or "live" postage indicia through postage metering operation of system 100. Thereafter, the postage indicia may be used to post mail items.

Such unassigned tokens may have a pre-established postage denomination associated therewith (e.g., $0.41) or may be denomination agnostic. A postage value for denomination agnostic tokens may be assigned upon activation as postage indicia, such as in accordance with an amount of postage value selected or an amount tendered for postage value during postage metering operations.

The aforementioned unassigned tokens are preferably assigned during postage metering operations to thereby become live postage. For example, scanner 141 operating under control of controller 150 may scan unique identification (e.g., using a barcode scanner, a MICR reader, an RFID scanner, optical character recognition (OCR) system, etc.) present on the mail items bearing tokens to identify the unassigned token, for assigning tokens as live postage. Scanner 141 may scan additional or alternative information present on the mail item, such as postage amount, address information, postal class, account for payment for postage value, etc. The identification information, preferably accompanied by additional information (e.g., postage indicia amount, postage class, account for payment of postage value, etc.) may be provided by controller 150 to an entity for assigning or activating the tokens as live postage and/or other processing, such as via network 160 (e.g., the Internet, the public switched telephone network (PSTN), a local area network (LAN), a wide area network (WAN), a wireless LAN (WLAN), etc.). For example, the foregoing information may be provided to postage service provider 170 (e.g., Internet postage provider) who may have initially produced the unassigned tokens for activation of the tokens.

In addition to or in the alternative to scanner 141 operating to scan mail items for unique identification and/or additional information, user input may be acquired, such as through display 151, keyboard 152, and/or pointer 153. For example, a user may input a desired amount of postage value for one or more mail items, an account to be used to pay for postage value, a postal class, address information, postal item weight, etc. for use in activating postage indicia, for printing on mail items, etc.

In operation according to embodiments of the invention, the identification information is used to assign or activate unassigned tokens, and thus the postage indicia generated therewith, to provide live postage indicia acceptable to a postal authority. For example, copies of the unassigned tokens, information included within the unassigned tokens, information identifying the unassigned tokens, etc. may be moved from an unassigned token database to an assigned token database to thereby activate the tokens, and thus the postage indicia created therewith, as live postage. Other information may additionally or alternatively be stored in association with activated tokens, such as user information (e.g., user identification, payment information, etc.), point of activation information (e.g., retailer identification, activation location, etc.), and/or the like.

Activation of the postage indicia preferably includes payment to a postal authority (e.g., the USPS) for the appropriate postage value, such as through decrementing a descending register of a postage security device, debiting a prepaid account, incrementing a postpaid account, and/or the like. The foregoing payment for postage value may be provided directly from a user, indirectly from a user through an activation service provider (e.g., retailer), indirectly from a user through a postage service provider (e.g., Internet postage provider), directly from an activation service provider, indirectly from an activation service provider through a postage service provider, etc.

After the foregoing activation of the postage indicia, individual postage indicium may be utilized to post mail items. The token present on any or each such postage indicium may be utilized at one or more points in a mail processing stream to validate the postage indicium, to detect fraud or misuse of tokens, etc.

Additional detail with respect to activation of postage indicia as may be utilized according to embodiments of the invention is provided in the above referenced patent application entitled "Systems and Methods for Activation of Postage Indicia at Point of Sale." It should be appreciated that, although embodiments described in the foregoing referenced patent application discuss postage indicia activation at a point of sale, the activation techniques described therein are applicable at the point of postage metering operations provided by postage metering systems, such as system 100, adapted according to embodiments of the invention.

In a postage indicia application embodiment postage indicia is preferably printed or otherwise applied to mail items. Accordingly, controller 150 of embodiments operates to generate suitable postage indicia for application on mail items. Scanner 141, operating under control of controller 150, may scan mail items to obtain information present on the mail item, such as postage amount, address information, postal class, account for payment for postage value, etc. In addition to or in the alternative to scanner 141 operating to scan mail items for unique identification and/or additional information, user input may be acquired, such as through display 151, keyboard 152, and/or pointer 153. For example, a user may input a desired amount of postage value for one or more mail items, an account to be used to pay for postage value, a postal class, address information, postal item weight, etc. for use in activating postage indicia, for printing on mail items, etc. Various information (e.g., postage indicia amount, postage class, account for payment of postage value, etc.) may be provided by controller 150 to an entity for generating postage indicia and/or other processing, such as via network 160. For example, the foregoing information may be provided to postage service provider 170 (e.g., Internet postage provider) for postage indicia generation. Detail with respect to processor-based systems cooperating to generate and print information based indicia and debit an appropriate account (or otherwise provide payment to a postal authority (e.g., the USPS) for the appropriate postage value) as may be used as postage indicia according to embodiments of the present invention is provided in the above referenced patent applications entitled" System and Method for Generating Postage indicia," "System and Method for Printing Multiple Postage Indicia," and "Computer-Based Value-Bearing Item Customization Security."

After its generation, postage indicia may be applied to mail items by marker 142 operating under control of controller 150. For example, in an ink nozzle embodiment marker 142 may expel ink droplets in a manner controlled to correspond with the orientation and drop rate (velocity) of a mail item in order to provide a printed postage indicia thereon. Alternative embodiments of the invention may print postage indicia on transfer media which is applied to the mail items. For example, marker 142 may deposit ink or toner on a pressure sensitive (e.g., "self-sticking") label which, thereafter, is disposed in gravity drop feed chute 113 to facilitate adherence of the label to a corresponding mail piece as that mail piece falls through the chute. To simplify control with respect to application of postage indicia on mail items, embodiments of the present invention may utilized one or more drop rate control apparatus and/or drop orientation control apparatus, such as those shown and described below regarding providing gravity feed mail item control, to control the drop rate (or portion thereof) and/or orientation of mail items.

It should be appreciated that processing provided with respect to postage metering operations may incur some time to complete in operation according to various embodiments, such as the aforementioned postage activation configurations and/or postage application configurations. For example, some appreciable amount of time may be needed to determine if a token is to be activated as postage indicia and thus marked as having been activated. Similarly, some appreciable amount of time may be needed to generate postage indicia for application on a mail item using information scanned from the mail item. Accordingly, scanner 141 and marker 142 of embodiments of the invention may be placed a sufficient distance apart in gravity drop feed chute 113 to accommodate completion of desired processing between operation of scanner 141 and marker 142. Additionally or alternatively, one or more drop rate control apparatus, such as those shown and described below regarding providing gravity feed mail item control, may be used to accommodate completion of desired processing between operation of scanner 141 and marker 142.

It is expected that embodiments of the invention implementing postage activation configurations are likely to incur less time to complete operations between scanning and marking, accordingly little or no drop rate control apparatus intervention may be used with respect to such embodiments, even where scanner 141 and marker 142 are disposed relatively close together in gravity drop feed chute 113. Moreover, marking of mail items having postage indicia activated by a postage activation configuration may not be implemented according to embodiments of the invention. Accordingly, very short gravity drop feed chute configurations, without scanner and marker spacing considerations or drop rate control apparatus, may be readily accommodated by embodiments of the invention.

Although embodiments have been described above with respect to the utilization of user input for particular information, such as weight, postal class, desired amount of postage, account information, address information, etc., embodiments of the present invention may operate to obtain such information from other sources. For example, scanner 141 may obtain such information from a face of mail items for which postage metering operations are performed, such as by optical character recognition, correlation of particular symbols to information, decoding barcoded and/or encrypted information, etc. Additionally or alternatively, system 100 may operate to determine such information, such as through operation of controller 150 and/or interaction with other systems via network 160.

As but one example of system 100 operating to determine information for use in postage metering operations according to embodiments of the invention, controller 150 may operate with one or more component of system 100 to automatically determine the weight of mail items and, using this weight information, determine an appropriate amount of postage for the mail items. Scales 181 and 182 are provided in the illustrated embodiment and are in communication with controller 150. Using scale 181, mail item weight may be determined from a difference in the weight before the mail item has been dropped from tray 110 into gravity drop feed chute 113 and the weight after the mail item has been dropped from tray 110 into gravity drop feed chute 113. Similarly, using scale 182, mail item weight may be determined from a difference in the weight before the mail item has been deposited in bin 130 by gravity drop feed chute 113 and the weight after the mail item has been deposited in bin 130 by gravity drop feed chute 113. This indirect or differential mail item weight may be determined by controller 150 using the aforementioned information as provided by scale 181 and/or 182. Although either one of scales 181 and 182 may be utilized to determine mail item weight, embodiments of the invention utilized a combination of such scales to provide a high level of confidence with respect to such indirect or differential mail item weight determinations.

Bin 130 of the illustrated embodiment is provided to collect mail items aster postage metering operations are performed according to embodiments of the invention. The illustrated embodiment of bin 130 is adapted to maintain an original order of mail items (e.g., a same order of mail items as was present in tray 110) after postage metering operations, such as to maintain a presort order, etc.

It should be appreciated that bin 130 utilized according to embodiments need not be integral to system 100. For example, bin 130 may comprise a separate mail bin as shown in FIG. 4. In the embodiment of FIG. 4, a postage metering system adapted according to the present invention is provided in a table top configuration, and thus rests on a top surface of table 400. Gravity drop feed chute 113 deposits mail items into bin 130 placed below the top surface of table 400 to collect mail items which have had postage metering operations performed with respect thereto. As a particular batch of postage metering operations has been completed, or as bin 130 becomes full, the bin may be removed and replaced with another bin.

Embodiments of the present invention may be utilized with respect to various numbers of output bins, if desired. For example, FIG. 5 shows an embodiment wherein bins 130 and 530 are provided to collect mail items which have had postage metering operations performed with respect thereto. Sorting apparatus 531, such as may comprise a diverter and actuator operable under control of controller 150, is disposed at the outlet of gravity drop feed chute 113 to provide control with respect to a particular bin mail items are deposited into. Sorting provided by sorting apparatus 531 may be provided to sort mail items based upon address information, weight, postage amount, postal class, user identification, etc. For example, controller 150 may analyze information scanned by scanner 141 to determine a proper bin for depositing a particular mail item, and thus may control sorting apparatus 531 accordingly. Additionally or alternatively, a user may select a particular bin for depositing one or more mail item.

Figure 6:
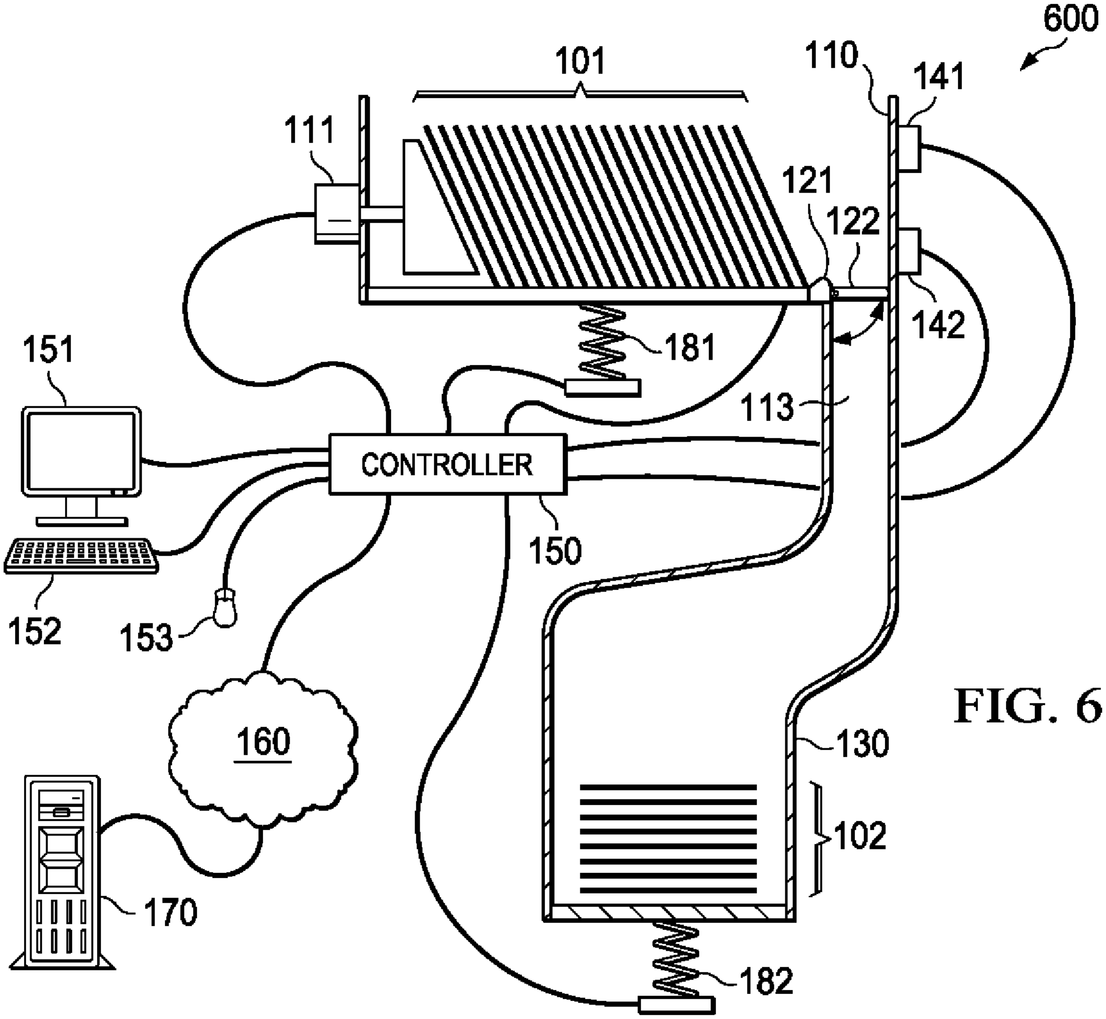
FIG. 6 shows a postage metering system adapted according to embodiments of the invention.

The embodiments discussed above have utilized gravity drop feed configurations to facilitate postage metering operations. The concepts of the present invention, however, may be utilized with respect to other configurations. For example, embodiments of the present invention may utilize gravity drop exit configurations, wherein at least a portion of postage metering operations is performed prior to gravity dropping of a mail item. Directing attention to FIG. 6, a postage metering system having a gravity drop exit configuration according to embodiments of the present invention is shown as system 600. System 600 is configured substantially like system 100 of FIGS. 1A and 1B. However, as at least a portion of postage metering operations is performed prior to gravity dropping of a mail item, system 600 of the illustrated embodiment is configured to dispose scanner 141 and marker 142 to interact with mail items still in tray 110.

In operation, system 600 utilizes scanner 141 and/or marker 142 to interact with mail items to provide postage metering operations with respect to a leading mail item of mail items 101. Such operation is preferably as described above with respect to the operation of an embodiment of system 100, and may include activation of postage indicia and/or application of postage indicia. Embodiments of the invention may operate to perform postage metering operations with respect to a mail item before singulation from mail items 101, such as where scanner 141 is used to activate a token as a valid postage indicia. Alternatively, embodiments of the invention may operate to perform singulation of a mail item before postage metering operations, such as where marker 142 is used to apply postage indicia to a mail item. For example, bias mechanism 111 and singulation boss 121 may be utilized to singulate a mail item from mail items 101 and dispose the mail item on singulation shutter 122 in close proximity to scanner 141 and marker 142. Singulation shutter 122 may operate to control the gravity drop exit of the mail item, such as after operation of scanner 141 and/or marker 142 has completed.

Irrespective of when singulation of mail items occurs, after at least partial postage metering operation processing in bin 110 mail items are gravity drop exited from tray 110 into gravity drop feed chute 113 for further handling. Such further handling may comprise depositing mail items into a bin, sorting, further postage metering operations, etc. For example, a combination of in-tray and drop processing of mail items may be provided, if desired. Embodiments of the invention may dispose scanner 141 in tray 110 and marker 142 in gravity drop feed chute 113, such as to allow scanning of information on mail items prior to gravity drop exit from tray 110 and to allow marking of mail items while dropping through gravity drop feed chute 113. Such embodiments may be utilized to provide desired processing times between such portions of postage metering operations.

Figure 7A:
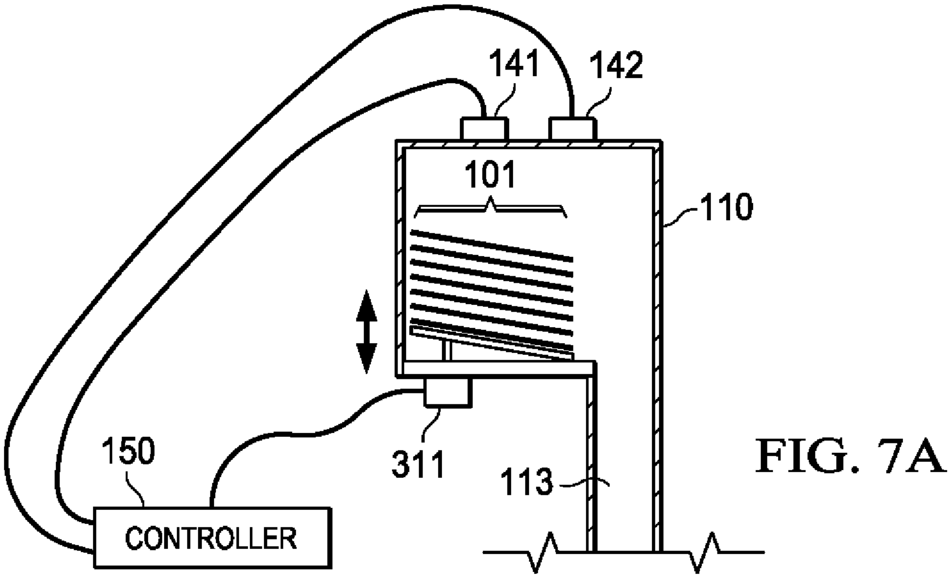
FIGS. 7A and 7B show embodiments disposing mail items in various orientations for postage metering operations.
Figure 7B:
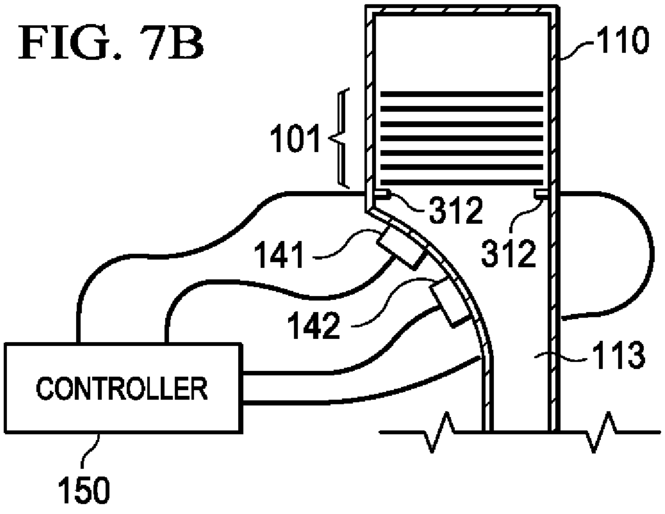

As with the gravity drop feed configurations discussed above, gravity drop exit configurations of the present invention are not limited to a particular orientation of mail items within tray 110. For example, FIGS. 7A and 7B show embodiments wherein the orientation of mail items being stored for postage metering operations are other than vertical. For example, FIG. 7A shows horizontally oriented mail items 101 resting on singulation tilt bed 311, operable as discussed above with reference to FIG. 3A. FIG. 7B shows horizontally oriented mail items 101 resting on singulation gate 312, operable as discussed above with reference to FIG. 3B.

Figure 8:
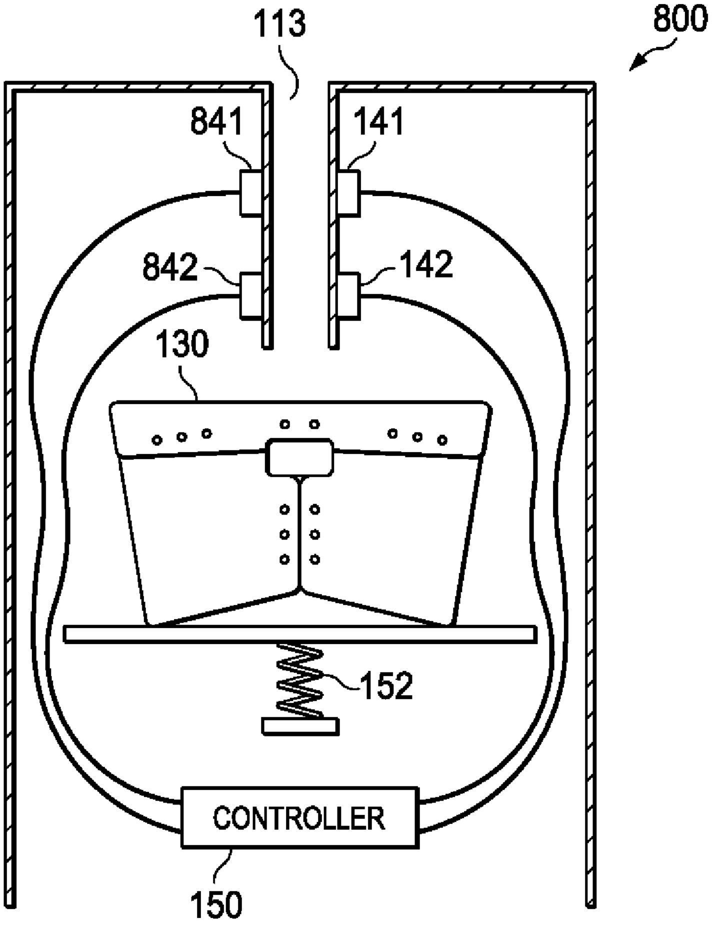
FIG. 8 shows a potage metering system adapted according to embodiments of the invention.

Although embodiments have been described above with respect to postage metering systems providing automated singulation of mail items, such as for high speed and/or bulk mailing operations, the concepts of the present invention are applicable to a number of postage metering and mailing applications. The embodiment illustrated in FIG. 8, for example, shows system 800 adapted for receiving manually singulated mail items. In the embodiment of FIG. 8, gravity drop feed chute 113 accepts mail items deposited by hand, such as at a USPS "blue box" public postal receptacle. In order to accommodate mail items facing multiple directions, system 800 of the illustrated embodiment includes scanner 141 and marker 142 disposed on a first side of gravity drop feed chute 113 and scanner 841 and marker 842 disposed on a second side of gravity drop feed chute 113. Scanner 841 and marker 842 preferably operate as described above with respect to scanner 141 and marker 142, respectively, thereby facilitating postage metering operation with respect to mail items deposited in gravity drop feed chute 113 facing to the left or to the right. Operation of system 800 may thus perform as described above with respect to operation of system 100. It should be appreciated that postage metering systems having automated singulators may be adapted to accommodate manual deposit of mail items consistent with system 800, such as through providing an appropriate entry into gravity drop feed chute 113 thereof.

Embodiments have been described herein with reference to a postage metering system controller communicating with external systems, such as postage service provider (e.g., Internet postage provider) systems for activation of postage indicia, moving postage indicia unique identifiers from an unassigned database to an assigned database, etc. However, embodiments of the present invention may operate without real-time or other communication links to external systems. For example, controller 150 may operate to store information with respect to postage metering operations, such as unique identifiers of activated postage indicia, postage amounts, address information, etc. for batch uploading. According to an embodiment where a postage metering system is disposed in the aforementioned USPS "blue box" public postal receptacle, such information may be downloaded from controller 150 by a postman when collecting the mail items, such as using a personal digital assistant (PDA), portable computer, or other processor-based terminal. Thereafter, the information may be provided to systems, such as postage service provider 170 for operation as described above.

Having described embodiments operable to provide gravity feed metering according to concepts of the invention, detail with respect to various techniques for providing gravity feed mail item control useful with respect to gravity feed metering is provided below. Referring again to FIG. 1A, system 100 of the illustrated embodiment includes mail item gravity drop controller 190 disposed in gravity drop feed chute 113 to facilitate desired manipulation of mail items passing therethrough, as described in further detail below.

Figure 9:
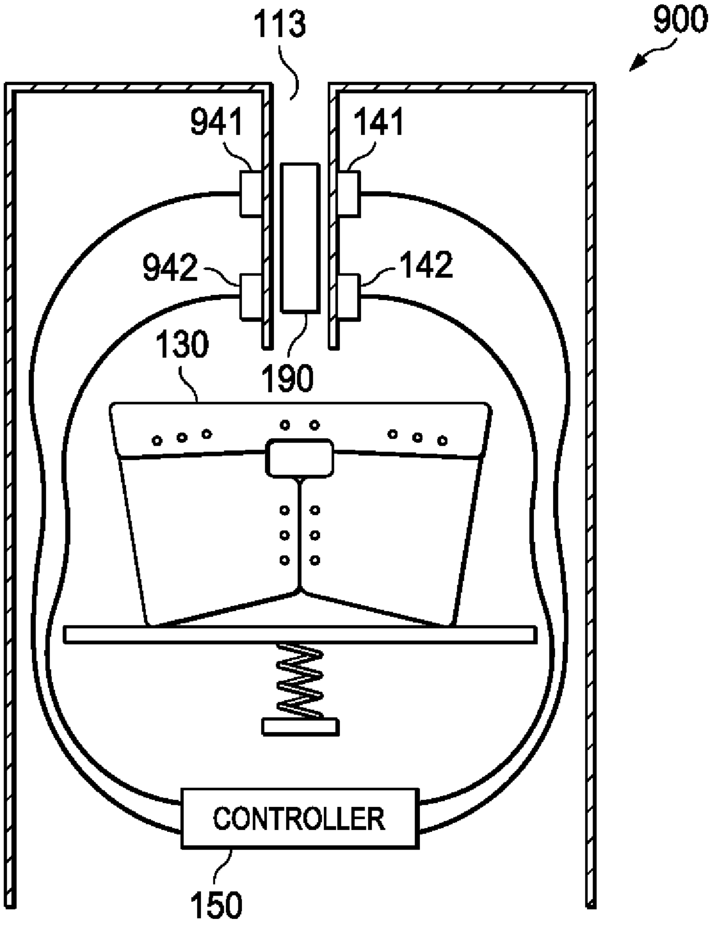
FIG. 9 shows an alternative embodiment of a postage metering system adapted according to an embodiment of the invention.

Although the foregoing embodiments of system 100 have been described above with respect to postage metering systems providing automated singulation of mail items, it should be appreciated that the concepts of the present invention are applicable to a number of postage metering and mailing apparatus configurations. The embodiment illustrated in FIG. 9, for example, shows system 900 adapted for receiving manually singulated mail items. In the embodiment of FIG. 9, gravity drop feed chute 113 accepts mail items deposited by hand, such as at a United States Postal Service (USPS) "blue box" public postal receptacle. In order to accommodate mail items facing multiple directions, system 900 of the illustrated embodiment includes scanner 141 and marker 142 disposed on a first side of gravity drop feed chute 113 and scanner 941 and marker 942 disposed on a second side of gravity drop feed chute 113. Scanner 941 and marker 942 preferably operate as described above with respect to scanner 141 and marker 142, respectively, thereby facilitating postage metering operation with respect to mail items deposited in gravity drop feed chute 113 facing to the left or to the right. Mail item gravity drop controller 190 is disposed in gravity drop feed chute 113 to provide mail item gravity drop feed control for postage metering operations performed by scanner 141, marker 142, scanner 941, and marker 942.

Although not shown in the embodiment of FIG. 1A, it should be appreciated that embodiments of system 100 providing automated singulation of mail items may be adapted to include additional or redundant postage metering apparatus to interact with mail items. For example, scanner 941 and marker 942, as shown in FIG. 9, may be provided with respect to gravity drop feed chute 113 of FIG. 1A.

Mail item gravity drop controller 190 of embodiments may comprise various configurations adapted to provide mail item orientation control, mail item gravity drop rate control, mail item drop control, etc. According to mail item gravity drop control configurations of embodiments of mail item gravity drop controller 190, mail item movement is controlled (e.g., slowed, temporarily stopped, etc.) to facilitate postage metering operations by scanner 141 and/or marker 142 (e.g., information scanning, token activation, information printing, postage indicia generation, postage indicia printing, etc.). Additionally or alternatively, mail item gravity drop control configurations of embodiments of gravity drop controller 190 the orientation of mail items is controlled (e.g., mail item facing, mail item positioning with respect to postage metering apparatus, mail item alignment, etc.) to facilitate postage metering operations by scanner 141 and/or marker 142. Where additional apparatus are disposed in gravity drop feed chute 113 to interact with mail items for postage metering operations, such as scanner 941 and marker 942, embodiments of mail item gravity drop controller 190 may additionally or alternatively be adapted to facilitate postage metering operations by such apparatus. From the discussion which follows, it will be appreciated that the placement of postage metering apparatus and mail item gravity drop controllers within gravity drop feed chute 113 may be altered depending upon the particular configuration utilized.

Mail item gravity drop controller 190 of embodiments of the present invention may be implemented in various forms. For example, mail item gravity drop controller 190 of embodiments may comprise one or more moving parts, such as to provide a pendulum gravity drop controller configuration, a dashpot gravity drop controller configuration, a continuous shelf elevator gravity drop controller, etc.

Figure 10A:
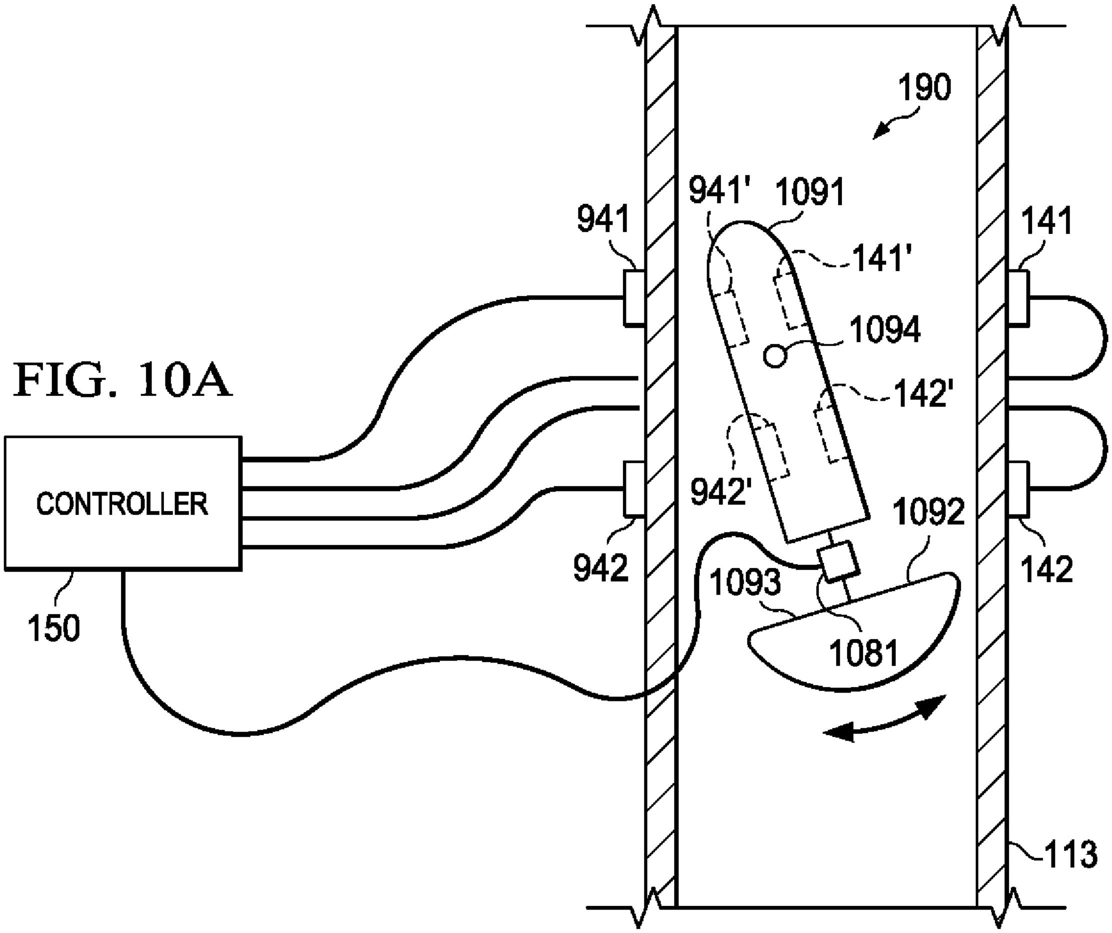
FIGS. 10A and 10B show a mail item gravity drop controller of an embodiment of the invention.
Figure 10B:
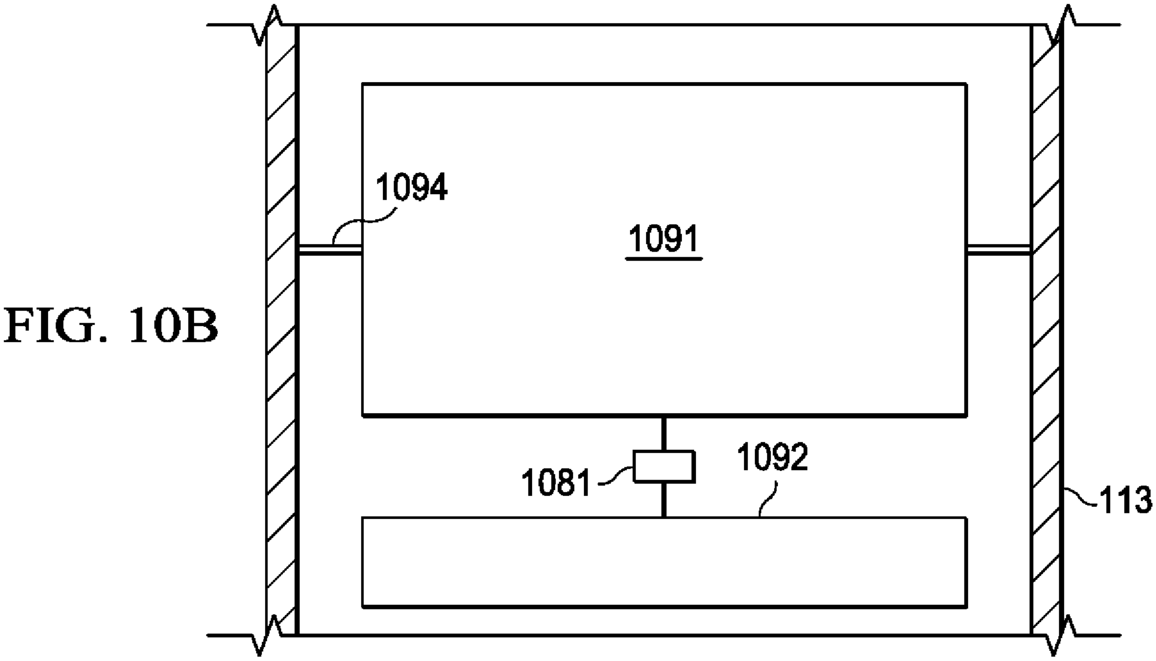

Directing attention to FIGS. 10A and 10B, an embodiment of mail item gravity controller 190 comprising a pendulum gravity drop controller configuration is shown. FIG. 10A shows mail item gravity controller 190 from a side view, consistent with the system views of FIGS. 1A and 9. FIG. 10B shows mail item gravity controller 190 from a front view, consistent with a view from the right of FIGS. 1A and 9.

Mail item gravity drop controller 190 of FIGS. 3A and 3B comprises pendulum 1091 disposed in gravity drop feed chute 113 to provide gravity drop control with respect to mail items introduced into gravity drop feed chute 113. Specifically, mail items will engage a side of pendulum 1091 as the mail items fall through gravity drop feed chute 113. A mail item engaging pendulum 1091 will continue to fall through gravity drop feed chute 113 until an edge of the mail item reaches one of shelves 1092 or 1093. The particular shelf reached by a mail item depends upon the orientation of pendulum 1091 as the mail item engages a side of pendulum 1091 (e.g., shelf 1092 when the top of pendulum 1091 is to the left side of gravity drop feed chute 113 in FIG. 3A, and shelf 1093 when the top of pendulum 1091 is to the right side of gravity drop feed chute 113 in FIG. 3A).

In operation according to a preferred embodiment, when a mail item engages a shelf of pendulum 1091, its fall through gravity drop feed chute 113 is slowed. That is, the fall of the mail item is slowed to the rate of movement provided by pendulum 1091 swinging about pivot 1094. As pendulum 1091 swings to the opposite side of its period from that in which the mail item engaged pendulum 1091, the edge of the mail item engaging a shelf of pendulum 1091 will slide from the shelf and again fall through gravity drop feed chute 113. The period of pendulum 1091 is preferably selected so as to provide a desired amount of time delay with respect to mail items passing through gravity drop feed chute 113 to facilitate desired postage metering operations with respect thereto. Thus, apparatus such as any or all of scanner 141, marker 142, scanner 941, and marker 942 may interact with the mail item to provide postage metering operations while the progression of the mail item through gravity drop feed chute 113 is delayed. Of course, apparatus such as any or all of scanner 141, marker 142, scanner 941, and marker 942 may additionally or alternatively interact with the mail item as the mail item progresses through gravity drop feed chute 113 unimpeded by pendulum 1091.

According to a preferred embodiment, pivot 1094 is disposed at a point very near the center of gravity of pendulum 1091 (the center of gravity of pendulum 1091 including all appendages thereto, such as shelves 1092 and 1093). For example, pivot 1094 may be provided at a point just above the center of gravity of pendulum 1091 to provide a steady state for pendulum 1091 wherein pendulum 1091 hangs vertically in gravity drop feed chute 113. As a mail item engages a shelf of pendulum 1091, the weight of the mail item on the shelf is sufficiently off of the centerline of pendulum 1091 to induce motion. As pendulum 1091 moves to center the downward weight vector of the combined weight, pendulum 1091 of embodiments will pivot to a point where the edge of the mail item engaging a shelf of pendulum 1091 will slide from the shelf and again fall through gravity drop feed chute 113.

Alternatively, pivot 1094 may be provided at a point just below the center of gravity of pendulum 1091 to provide a steady state for pendulum 1091 wherein the top and/or bottom of pendulum 1091 rests against a wall of gravity drop feed chute 113 (substantially in the position shown in FIG. 10A). As a mail item engages a shelf of pendulum 1091, the weight of the mail item on the shelf changes the center of gravity to below pivot 1094 and thus induces motion. As pendulum 1091 moves toward a steady state associated with the new center of gravity, pendulum 1091 of embodiments will pivot to a point where the edge of the mail item engaging a shelf of pendulum 1091 will slide from the shelf and again fall through gravity drop feed chute 113.

Where pendulum 1091 is adapted to engage mail items on both sides of the pendulum, embodiments of the invention may implement redundant postage metering apparatus (e.g., scanner 941 and/or marker 942 in addition to scanner 141 and/or marker 142) for postage metering operation on each such side of pendulum 1091. Where each mail item faces a same way when as introduced in gravity drop feed chute 113, such redundant postage metering apparatus may be disposed differently to accommodate postage metering operations. For example, where the mail items face to the right in FIG. 10A, scanner 141 and marker 142 disposed in a wall of gravity drop feed chute 113 may be provided for interacting with mail items engaging shelf 1092, whereas scanner 941' and 942' disposed in a side of pendulum 1091 may be provided for interacting with mail items engaging shelf 1093. Where the orientation of mail items is unknown or uncontrolled (e.g., in the case of mail items deposited by hand at a USPS "blue box" public postal receptacle), the foregoing redundancy may be expanded to include scanner 141, marker 142, scanner 141', and marker 142' to interact with mail items engaging shelf 1092 in any direction and scanner 941, marker 942, scanner 941', and marker 942' to interact with mail items engaging shelf 1091 in any direction.

The foregoing redundancy of postage metering apparatus does not prohibitively add to the complexity or expense of a postage metering system according to embodiments. For example, where relatively inexpensive and commonly available apparatus are used to provide postage metering operations, such redundancy is not expected to present a significant obstacle to deployment or use. In particular, embodiments in which tokens are activated as postage indicia using scanner technology as shown and described in the above referenced applications entitled "Systems and Methods Utilizing Gravity Feed for Postage Metering," "Systems and Methods for Activation of Postage Indicia at Point of Sale," and "Systems and Methods for Distributed Activation of Postage" may be readily adapted to provide the above described redundancy.

Embodiments of the invention, however, are adapted to minimize or avoid redundancy with respect to postage metering apparatus. For example, an embodiment using a configuration of pendulum 1091 wherein pivot 1094 is disposed below the center of gravity may be configured to operate without redundant postage metering apparatus (e.g., use only scanner 141 and/or marker 142) by selecting the period of pendulum 1091 to engage a mail item on a shelf thereof (e.g., shelf 1092), pivot to disengage the mail item, and return to the initial position to engage a next mail item on the shelf in sufficient time to accommodate the gravity feed rate of the mail items. Such a configuration may accommodate mail items introduced into gravity drop feed chute 113 in different orientations using a single redundant set of postage metering apparatus (e.g., scanner 141' and marker 142').

In addition to providing control with respect to the rate at which mail items proceed through gravity drop feed chute 113, pendulum 1091 of embodiments is adapted to provide control with respect to mail item orientation. For example, shelves 1092 and 1093 are adapted to provide a surface which, when engaging an edge of a mail item, supports the mail item in a desired orientation. Although mail items may fall through gravity drop feed chute 113 tilted side to side and/or front to back, shelves of pendulum 1091 of embodiments will engage the mail item to provide a level side to side orientation, such as to facilitate improved scanning of information thereon, printing in a desired orientation, etc. Similarly, a longitudinal side of pendulum 1091 may cooperate with a shelf of pendulum 1091 to temporarily hold mail items in a desired front to back orientation to facilitate scanning, printing, etc.

Figure 11:
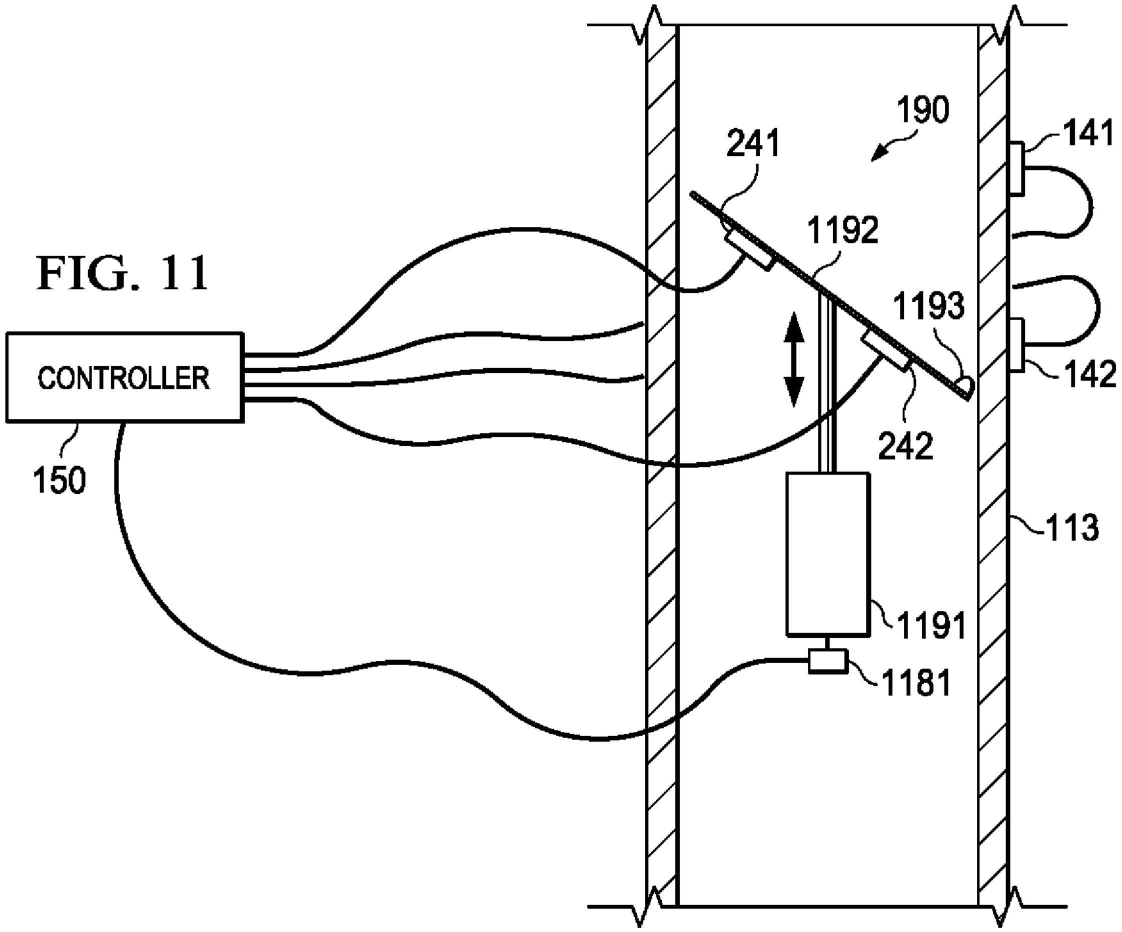
FIG. 11 shows a mail item gravity drop controller of an alternative embodiment of the invention.

Directing attention to FIG. 11, an embodiment of mail item gravity controller 190 comprising a dashpot gravity drop controller configuration is shown. Mail item gravity drop controller 190 of FIG. 11 comprises dashpot 1191 disposed in gravity drop feed chute 113 to provide gravity drop control with respect to mail items introduced into gravity drop feed chute 113. Specifically, mail items will engage tray 1192 as the mail items fall through gravity drop feed chute 113. A mail item engaging tray 1192 will continue to fall through gravity drop feed chute 113 until an edge of the mail item reaches boss 1193.

In operation according to a preferred embodiment, when a mail item engages boss 1193, its fall through gravity drop feed chute 113 is slowed. That is, the fall of the mail item is slowed to the rate of movement allowed by dashpot 1191. As dashpot 1191 reaches a compressed state, the mail item is allowed to slide from tray 1192 and again fall through gravity drop feed chute 113. For example, boss 1193 may interact with a release mechanism as dashpot 1191 reaches a fully compressed state to thereby retract boss 1193 and allow a mail item on tray 1192 to slide off of tray 1192 and fall through a gap between tray 1192 and a wall of gravity drop feed chute 113. The release mechanism may again be engaged by boss 1193 as dashpot 1191 uncompresses after passing of the mail item, in readiness for a next mail item. Additionally or alternatively, a tilt mechanism of tray 1192 may interact with a release mechanism as dashpot 1191 reaches a fully compressed state to thereby tilt sufficiently to allow a mail item thereon to slide off and fall further into gravity drop feed chute 113. The tilt mechanism may again be engaged on tray 1192 as dashpot 1191 uncompresses after passing of the mail item, in readiness for a next mail item.

The compression rate and/or stroke of dashpot 1191 are preferably selected so as to provide a desired amount of time delay with respect to mail items passing through gravity drop feed chute 113 to facilitate desired postage metering operations with respect thereto. Thus, apparatus such as any or all of scanner 141, marker 142, scanner 941, and marker 942 may interact with the mail item to provide postage metering operations while the progression of the mail item through gravity drop feed chute 113 is delayed. Of course, apparatus such as any or all of scanner 141, marker 142, scanner 941, and marker 942 may additionally or alternatively interact with the mail item as the mail item progresses through gravity drop feed chute 113 unimpeded by dashpot 1191.

Where the orientation of mail items is unknown or uncontrolled (e.g., in the case of mail items deposited by hand at a USPS "blue box" public postal receptacle), redundancy with respect to postage metering apparatus may be provided with respect to the dashpot gravity drop controller configuration of FIG. 11, similar to that discussed above with respect to the pendulum gravity drop controller configuration of FIGS. 10A and 10B. For example, scanner 941 and/or marker 942 may be disposed on tray 1192 to interact with mail items engaging tray 1192 and facing away from scanner 141 and/or marker 142.

In addition to providing control with respect to the rate at which mail items proceed through gravity drop feed chute 113, dashpot gravity drop controllers of embodiments are adapted to provide control with respect to mail item orientation. For example, tray 1192 and boss 1193 are adapted to provide surfaces which, when engaging a mail item, supports the mail item in a desired orientation. Although mail items may fall through gravity drop feed chute 113 tilted side to side and/or front to back, boss 1193 of embodiments will engage the mail item to provide a level side to side orientation, such as to facilitate improved scanning of information thereon, printing in a desired orientation, etc. Similarly, tray 1192 may cooperate with boss 1193 to temporarily hold mail items in a desired front to back orientation to facilitate scanning, printing, etc.

Figure 12:
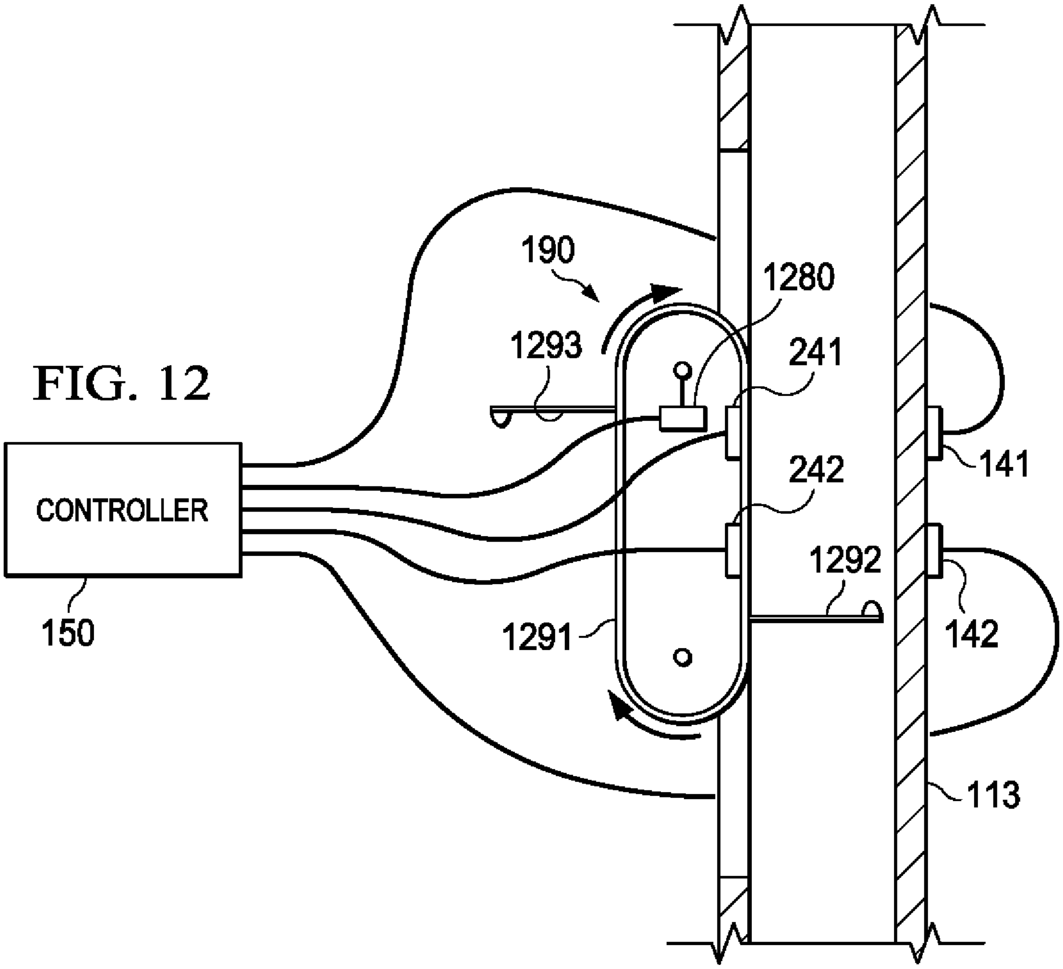
FIG. 12 shows a mail item gravity drop controller of another alternative embodiment of the invention.

Directing attention to FIG. 12, an embodiment of mail item gravity controller 190 comprising a continuous shelf elevator gravity drop controller configuration is shown. Mail item gravity drop controller 190 of FIG. 12 comprises continuous shelf elevator 1291 disposed in gravity drop feed chute 113 to provide gravity drop control with respect to mail items introduced into gravity drop feed chute 113. Specifically, mail items will engage one of shelves 1292 and 1293 as the mail items fall through gravity drop feed chute 113.

In operation according to a preferred embodiment, when a mail item engages one of shelves 1292 or 1293, its fall through gravity drop feed chute 113 is slowed. That is, the fall of the mail item is slowed to the rate of movement allowed by continuous shelf elevator 1291. As the particular shelf reaches the lower end of continuous shelf elevator 1291, the mail item is allowed to slide from the shelf and again fall through gravity drop feed chute 113. Various structure, such as bosses, may be provided on shelves 1292 and 1293 to provide additional control with respect to mail items, if desired.

The rotation rate and/or length of continuous shelf elevator 1291 are preferably selected so as to provide a desired amount of time delay with respect to mail items passing through gravity drop feed chute 113 to facilitate desired postage metering operations with respect thereto. Thus, apparatus such as any or all of scanner 141, marker 142, scanner 941, and marker 942 may interact with the mail item to provide postage metering operations while the progression of the mail item through gravity drop feed chute 113 is delayed. Of course, apparatus such as any or all of scanner 141, marker 142, scanner 941, and marker 942 may additionally or alternatively interact with the mail item as the mail item progresses through gravity drop feed chute 113 unimpeded by continuous shelf elevator 1291.

Where the orientation of mail items is unknown or uncontrolled (e.g., in the case of mail items deposited by hand at a USPS "blue box" public postal receptacle), redundancy with respect to postage metering apparatus may be provided with respect to the continuous shelf elevator gravity drop controller configuration of FIG. 12, similar to that discussed above with respect to the pendulum gravity drop controller configuration of FIGS. 10A and 10B and dashpot gravity drop controller configuration of FIG. 11. For example, scanner 941 and/or marker 942 may be disposed on a wall of gravity drop feed chute 113 opposite scanner 141 and/or marker 142, such as to a side of continuous shelf elevator 1291, behind a window of continuous shelf elevator

1291, etc., to interact with mail items engaging shelves of continuous shelf elevator 1291 and facing away from scanner 141 and/or marker 142.

In addition to providing control with respect to the rate at which mail items proceed through gravity drop feed chute 113, continuous shelf elevator gravity drop controllers of embodiments are adapted to provide control with respect to mail item orientation. For example, shelves 1292 and 1293 are adapted to provide surfaces which, when engaging a mail item, supports the mail item in a desired orientation. Although mail items may fall through gravity drop feed chute 113 tilted side to side and/or front to back, shelves 1292 and 1293 of embodiments will engage the mail item to provide a level side to side orientation, such as to facilitate improved scanning of information thereon, printing in a desired orientation, etc. Similarly, shelves 1292 and 1293 may cooperate with a corresponding longitudinal side of continuous shelf elevator 1291 to temporarily hold mail items in a desired front to back orientation to facilitate scanning, printing, etc.

It should be appreciated that, although the embodiments of pendulum gravity drop controllers, dashpot gravity drop controllers, and continuous shelf elevator gravity drop controllers discussed above utilize moving parts, these gravity drop controllers provide relatively simple machines which should be both inexpensive and simple to produce as well as reliable and easily maintained. For example, preferred embodiments of the foregoing gravity drop controllers provide controlled movement of mail items without the use of active motors, actuators, and/or the like. Instead, such embodiments utilize the weight of mail items and/or the kinetic energy of mail items falling through gravity drop feed chute 113 to provide desired movement of the mechanisms thereof. Various techniques may be implemented to control such movement, such as through the use of fluid (e.g., gas or oil) filled pistons, gearing, friction drag, etc. However, alternative embodiments of the invention may be provided which implement active motors, actuators, etc., if desired. For example, a motor or actuator may be provided for use in particular situations, such as where unusually light mail items (e.g., postcards) are to be processed.

Mail item gravity drop controllers of embodiments may comprise no moving parts. For example, mail item gravity drop controller 190 of embodiments may comprise one or more physical or structural attribute suitable for interacting with mail items and provide gravity drop control thereto.

Figure 13:
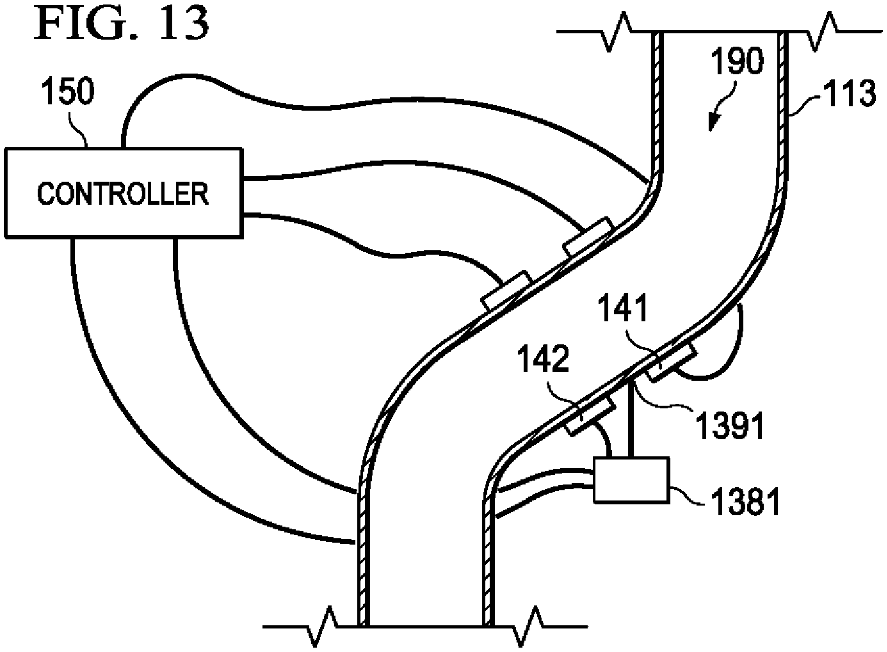
FIG. 13 shows a mail item gravity drop controller of still another alternative embodiment of the invention.

Directing attention to FIG. 13, an embodiment of mail item gravity controller 190 comprising a slope change gravity drop controller configuration is shown. Mail item gravity drop controller 190 of FIG. 13 comprises slope change 1391 disposed in gravity drop feed chute 113 to provide gravity drop control with respect to mail items introduced into gravity drop feed chute 113. Specifically, mail items will engage slope change 1391 as the mail items fall through gravity drop feed chute 113.

In operation according to a preferred embodiment, when a mail item engages slope change 1391, its fall through gravity drop feed chute 113 is slowed. That is, the fall of the mail item is slowed by drag induced thereon by slope change 1391. As the mail item reaches the end of slope change 1391, the mail item slides off of slope change 1391 and again falls through gravity drop feed chute 113. Various structure, such as bosses, may be provided on a surface of slope change 1391 to provide additional control with respect to mail items, if desired.

The slope and/or surface of slope change 1391 are preferably selected so as to provide a desired amount of time delay with respect to mail items passing through gravity drop feed chute 113 to facilitate desired postage metering operations with respect thereto. Thus, apparatus such as any or all of scanner 141, marker 142, scanner 941, and marker 942 may interact with the mail item to provide postage metering operations while the progression of the mail item through gravity drop feed chute 113 is delayed. Of course, apparatus such as any or all of scanner 141, marker 142, scanner 941, and marker 942 may additionally or alternatively interact with the mail item as the mail item progresses through gravity drop feed chute 113 unimpeded by slope change 1391.

Where the orientation of mail items is unknown or uncontrolled (e.g., in the case of mail items deposited by hand at a USPS "blue box" public postal receptacle), redundancy with respect to postage metering apparatus may be provided with respect to the slope change gravity drop controller configuration of FIG. 13, similar to that discussed above with respect to the gravity drop controller configurations discussed above. For example, scanner 941 and/or marker 942 may be disposed on a wall of gravity drop feed chute 113 opposite slope change 1391, to interact with mail items engaging slope change 1391 and facing away from scanner 141 and/or marker 142.

In addition to providing control with respect to the rate at which mail items proceed through gravity drop feed chute 113, slope change gravity drop controllers of embodiments are adapted to provide control with respect to mail item orientation. For example, slope change 1391 is adapted to provide a surface which, when engaging a mail item, supports the mail item in a desired orientation. Although mail items may fall through gravity drop feed chute 113 tilted side to side and/or front to back, the surface of slope change 1391 of embodiments will engage the mail item to hold mail items in a desired front to back orientation to facilitate scanning, printing, etc.

Embodiments of the invention may implement mail item gravity drop controllers alone or in combinations to provide desired control with respect to mail item gravity dropping for postage metering operations. For example, a friction interface surface (e.g., comprised of a plurality of friction rollers, friction perturbations, friction materials, etc.) may be utilized in combination with a surface of one of the foregoing mail item gravity drop controllers, such as to provide a friction interface surface on a side of pendulum 1091, a face of tray 1192, or a surface of slope change 1391. As another example, a combination of continuous shelf elevator 1291 and slope change 1391 may be utilized to provide desired control with respect to mail item gravity dropping. Such combinations may be utilized to provide a particular desired combined drop rate and/or orientation. Likewise, such combinations may be utilized to control mail item drop for interaction with different postage metering apparatus (e.g., one mail item gravity drop controller used with respect to a first postage metering apparatus, such as scanner 141, and another mail item gravity drop controller used with respect to a second postage metering apparatus, such as marker 142).

Mail item gravity drop controllers of embodiments of the invention provide functionality in addition to mail item gravity drop control. For example, mail item gravity drop controllers of embodiments provide mail item weighing in addition to providing mail item movement and/or orientation control. Accordingly, the illustrated embodiments of pendulum 1091, dashpot 1191, continuous shelf elevator 1291, and slope change 1391 include weighing apparatus, shown as weighing apparatus 1081, 1181, 1281, and 1381 respectively. Weighing apparatus as may be utilized according to embodiments of the invention may comprise any of a number of configurations, including load cells, spring scales, balances, etc. Preferred embodiments of the invention implement a load cell in association with a mail item gravity drop controller because of the relatively small size of load cells. Accordingly, such a weighing apparatus may readily be disposed in or on a mail item gravity drop controller, such as between shelves 1092 and 1093 and pivot 1094 of pendulum 1091, to thereby provide mail item weight information.

Information from weighing apparatus of embodiments of the invention may be provided to a processor-based system, such as controller 150, for processing. For example, controller 150 may use such weight information to calculate a proper amount of postage for a corresponding mail item. Thereafter, a token may be activated as postage indicia having a value of the proper amount of postage, postage indicia having a value of the proper amount of postage may be generated, etc.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system comprising:

a memory configured to store postage indicia data;

an input receptacle for receiving a mail item bearing address information;

a scanner;

a scale;

a controller configured to:

extract the address information from the mail item based on scanning the mail item via the scanner;

determine a weight of the mail item via the scale;

generate postage indicium data based on the address information and the weight;

store the postage indicium data in the memory;

charge an amount corresponding to a postage value represented by the postage indicium to a postage account via transmission of identification information included in the address information to a postage service provider system;

a printer configured to print a postage indicium on the mail item based on the postage indicium data;

a storage receptacle configured to store the mail item subsequent to the printing, wherein the mail item is retrievable from the storage receptacle to place the mail item into a mail stream of a delivery service provider; and a housing, wherein the input receptacle, the scanner, the scale, the printer, the controller, and the storage receptacle are disposed within the housing.

2. The system of claim 1, wherein the mail item does not include an indicia when received at the input receptacle.

3. The system of claim 2, wherein the controller is configured to extract unactivated token information from a second mail item, wherein the second mail item is received at the input receptacle prior to the scan, wherein the second mail item bears a machine readable token, and wherein the unactivated token information is extracted based on a scan of the machine readable token via the scanner.

4. The system of claim 3, wherein the controller is configured to activate the machine readable token based on the unactivated token information extracted from the second mail item and to store activation information associated with activation of the machine readable token at a database.

5. The system of claim 3, wherein the machine readable token is denomination agnostic.

6. The system of claim 5, wherein the denomination agnostic machine readable token is associated with a postage value by the activation.

7. The system of claim 3, wherein the machine readable token is associated with a predetermined postage value.

8. The system of claim 1, further comprising a gravity feed drop chute, wherein the mail item enters the storage receptacle through the gravity feed drop chute.

9. The system of claim 1, further comprising:

a second scanner, wherein the scanner is configured to scan mail items received at the input receptacle in a first orientation and the second scanner is configured to scan mail items received at the input receptacle in a second orientation; and a second printer, wherein the printer is configured to print postage indicia on mail items received at the input receptacle in the first orientation and the second printer is configured to print postage indicia on mail items received at the input receptacle in the second orientation.

10. The system of claim 9, wherein the second scanner and the second printer are disposed within the housing.

11. The system of claim 9, wherein the printer is positioned opposite the second printer along a path of travel used to transport the mail item from the input receptacle to the storage receptacle.

12. The system of claim 9, wherein the scanner is positioned opposite the second scanner along a path of travel used to transport the mail item from the input receptacle to the storage receptacle.

13. The system of claim 9, wherein the mail item passes the scanner and the second scanner prior to passing the printer and the second printer during transport of the mail item from the input receptacle to the storage receptacle.

14. The system of claim 1, wherein the controller is configured to calculate a postage value for the mail item based at least on the weight.

15. The system of claim 1, wherein the mail item comprises an envelope bearing the address information.

16. The system of claim 1, wherein the housing comprises a public postal receptacle.

17. The system of claim 1, further comprising a singulator configured to control processing of mail items received at the input receptacle.

18. The system of claim 1, wherein the weight of the mail item is determined via the scale prior to the scan.

19. A system comprising:

a memory configured to store postage indicia data;

an input receptacle for receiving a mail item bearing address information;

a scanner;

a scale;

a controller configured to:

extract the address information from the mail item based on scanning the mail item via the scanner;

determine a weight of the mail item via the scale;

generate postage indicium data based on the address information and the weight; and store the postage indicium data in the memory;

a printer configured to print a postage indicium on the mail item based on the postage indicium data;

a gravity feed drop chute;

a storage receptacle configured to store the mail item subsequent to the printing, wherein the mail item is retrievable from the storage receptacle to place the mail item into a mail stream of a delivery service provider, and wherein the mail item enters the storage receptacle through the gravity feed drop chute; and a housing, wherein the input receptacle, the scanner, the scale, the printer, the controller, and the storage receptacle are disposed within the housing.

* * * * *